(12) United States Patent
Takahashi et al.

(10) Patent No.: US 8,085,626 B2
(45) Date of Patent: Dec. 27, 2011

(54) OPTICAL PICKUP DEVICE AND LENS FOR OPTICAL PICKUP

(75) Inventors: Yuichi Takahashi, Nara (JP); Fumitake Sakai, Osaka (JP); Yukio Hibino, Osaka (JP); Koichi Muramatsu, Osaka (JP); Kazuo Momoo, Osaka (JP)

(73) Assignee: Panasonic Corporation, Osaka (JP)

( * ) Notice: Subject to any disclaimer, the term of this patent is extended or adjusted under 35 U.S.C. 154(b) by 59 days.

(21) Appl. No.: 12/628,555

(22) Filed: Dec. 1, 2009

(65) Prior Publication Data
US 2010/0135144 A1 Jun. 3, 2010

(30) Foreign Application Priority Data
Dec. 2, 2008 (JP) .................. 2008-307316

(51) Int. Cl.
*G11B 7/00* (2006.01)
(52) U.S. Cl. .................. 369/44.23; 369/112.05
(58) Field of Classification Search .......... None
See application file for complete search history.

(56) References Cited

U.S. PATENT DOCUMENTS

| | | | | |
|---|---|---|---|---|
| 7,773,304 B2 * | 8/2010 | Matsuzaki et al. | ............ | 359/649 |
| 2005/0280907 A1 | 12/2005 | Hayashi et al. | | |
| 2006/0077809 A1 * | 4/2006 | Makita et al. | ............... | 369/44.37 |
| 2006/0098554 A1 * | 5/2006 | Ariyoshi et al. | ......... | 369/112.05 |
| 2008/0095017 A1 * | 4/2008 | Kawamura et al. | ...... | 369/112.24 |

FOREIGN PATENT DOCUMENTS

| | | |
|---|---|---|
| JP | 2002-092926 | 3/2002 |
| JP | 3297505 | 4/2002 |
| JP | 2005-322281 | 11/2005 |

* cited by examiner

*Primary Examiner* — Jorge L Ortiz Criado
(74) *Attorney, Agent, or Firm* — Renner, Otto, Boisselle & Sklar, LLP

(57) ABSTRACT

An optical pickup device according to the present invention comprises: a first mirror for reflecting a first light beam outputted from a first light source and letting a second light beam outputted from a second light source pass therethrough; a first object lens for converging the first light beam reflected by the first mirror on an information recording surface of a recording medium; a second mirror for reflecting the second light beam passing through the first mirror; a second object lens for converging the second light beam reflected by the second mirror on the information recording surface of the recording medium; and an achromatic lens for correcting an axial chromatic aberration of the second object lens generated by wavelength variation of the second light beam, wherein the achromatic lens is provided in an optical path between the first mirror and the second mirror.

10 Claims, 16 Drawing Sheets

F I G. 3A
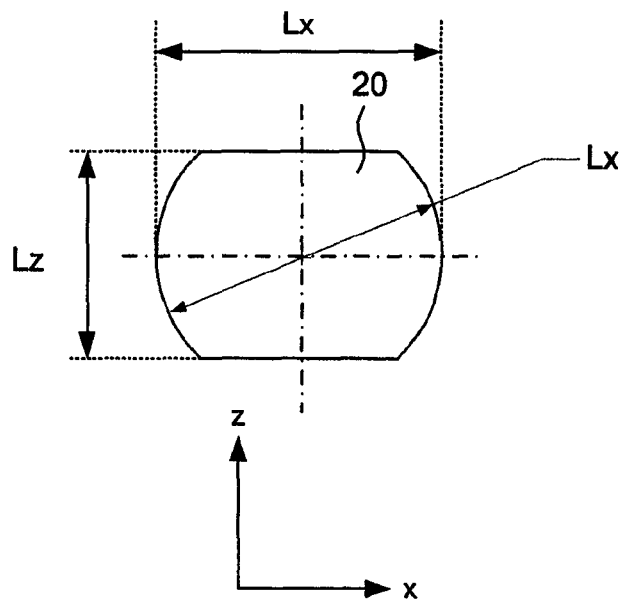
F I G. 3B
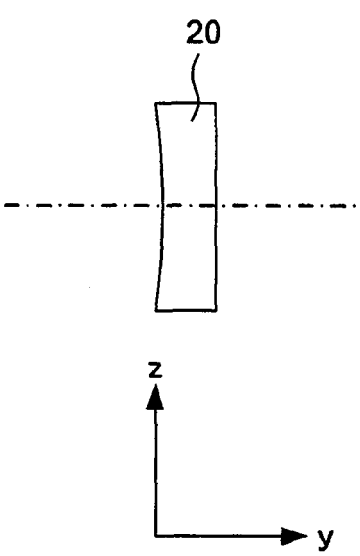
F I G. 3C
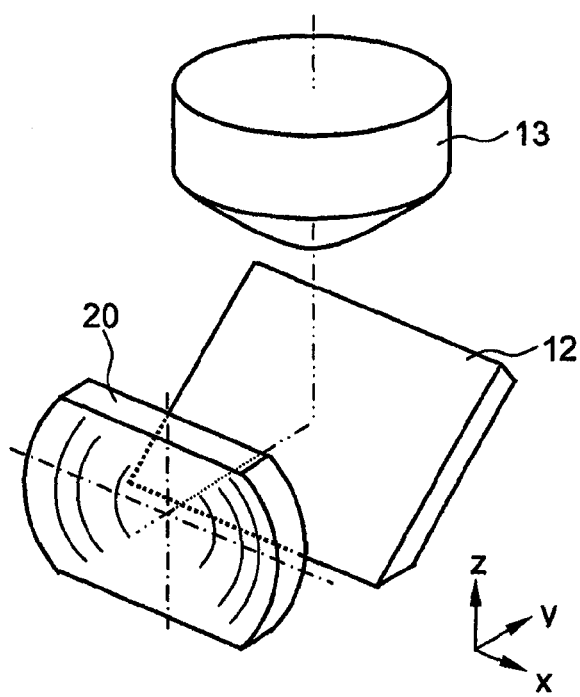

F I G. 4
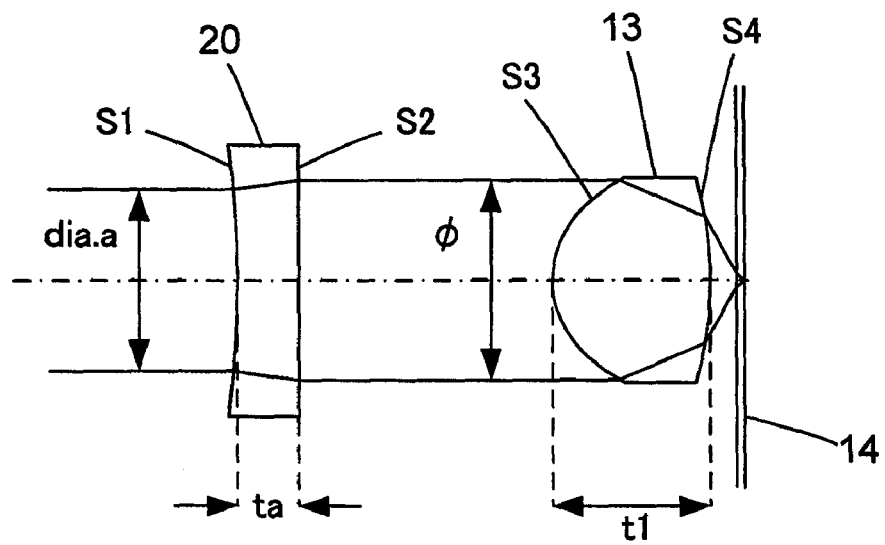
F I G. 5
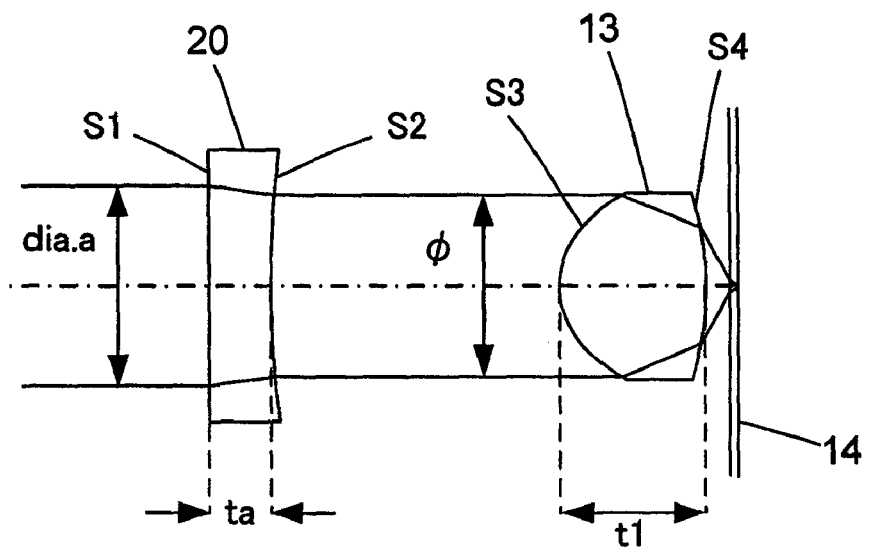

F I G. 6
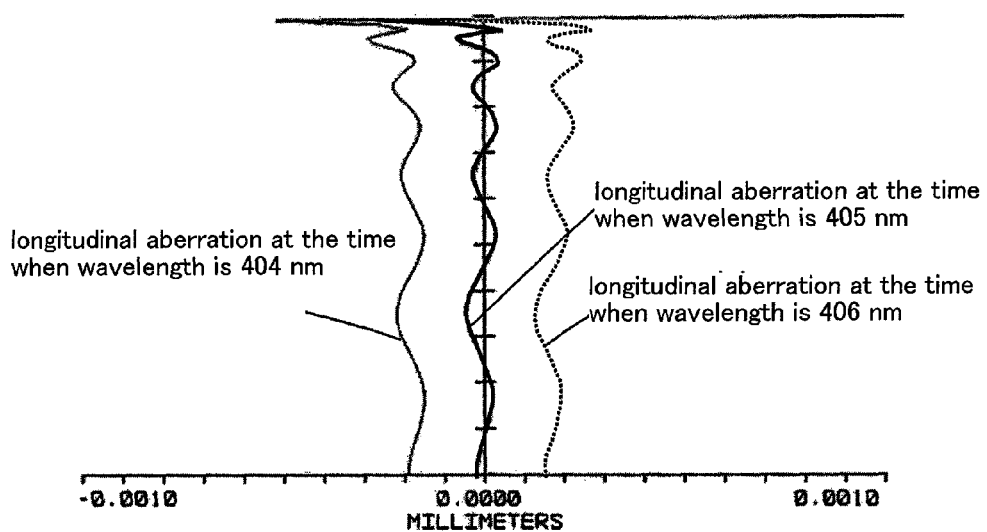
F I G. 7
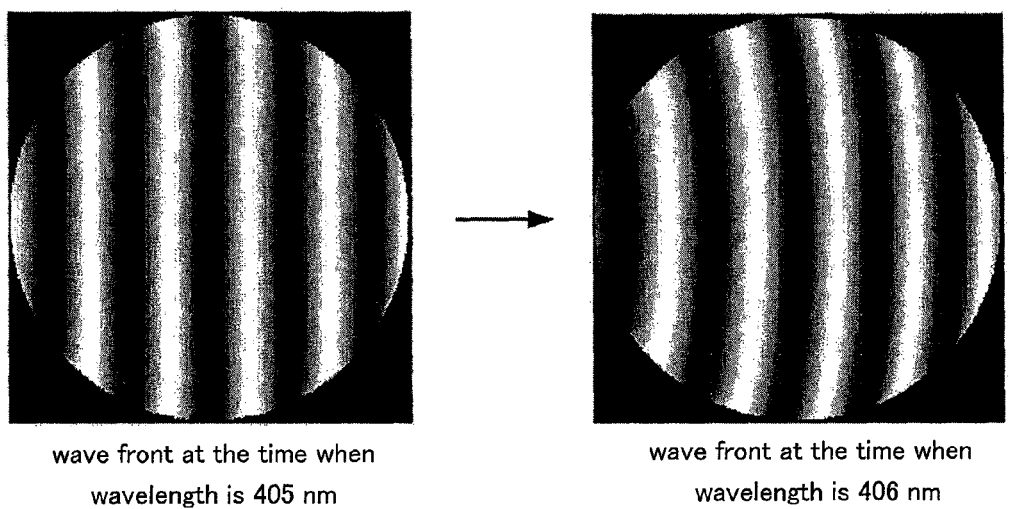
wave front at the time when wavelength is 405 nm
wave front at the time when wavelength is 406 nm wave front at the time when wavelength is 405 nm wave front at the time when wavelength is 406 nm wave front at the time when wavelength is 405 nm wave front at the time when wavelength is 406 nm FIG. 12
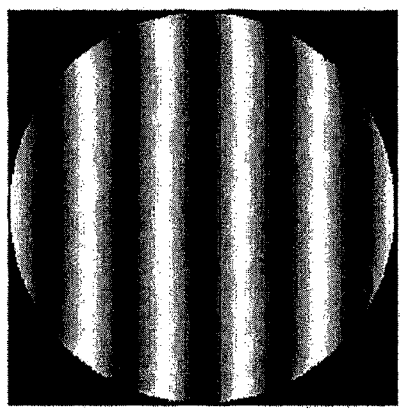
wave front at the time when
wavelength is 405 nm
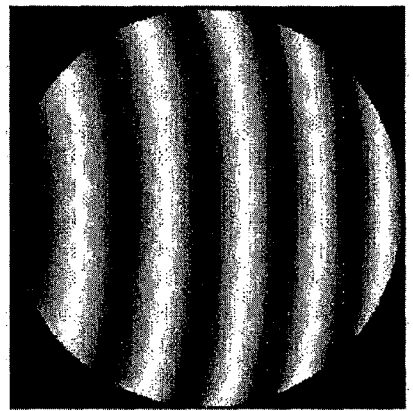
wave front at the time when
wavelength is 406 nm
FIG. 13
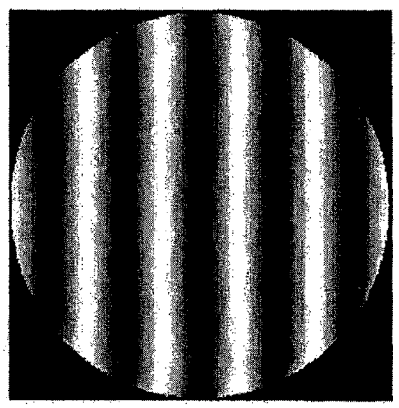
wave front at the time when
wavelength is 405 nm
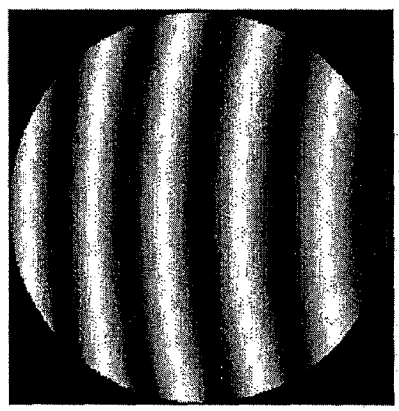
wave front at the time when
wavelength is 406 nm wave front at the time when
wavelength is 405 nm wave front at the time when
wavelength is 406 nm F I G. 1 6
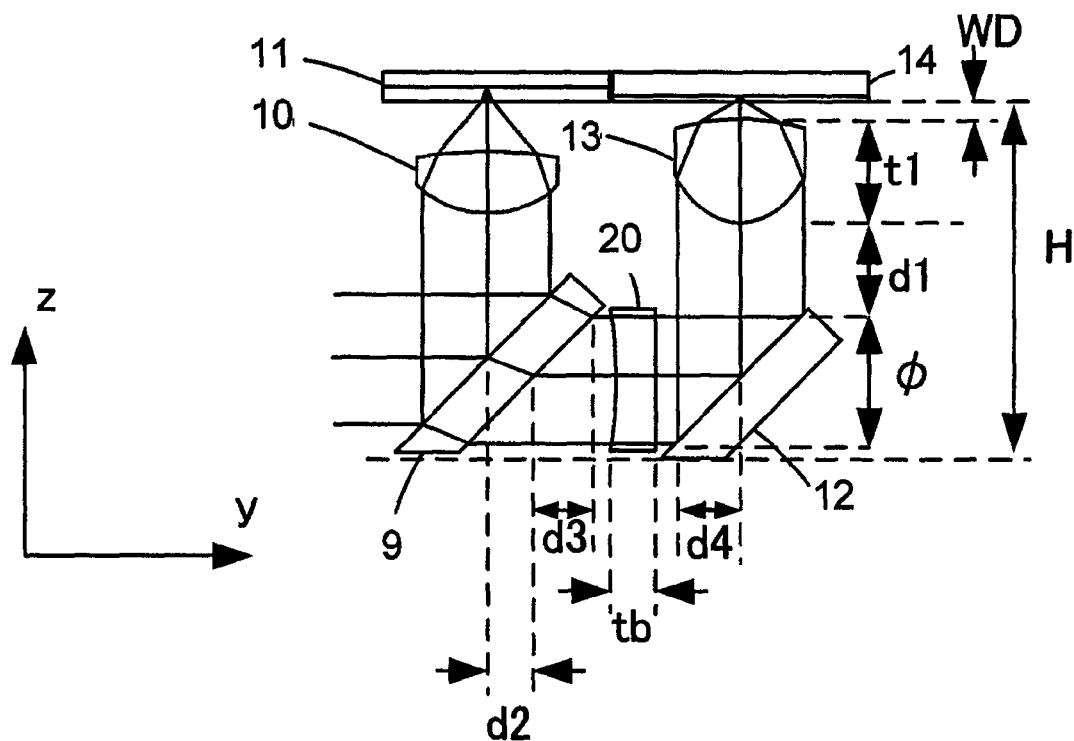

wave front at the time when wavelength is 405 nm wave front at the time when wavelength is 406 nm F I G. 2 0
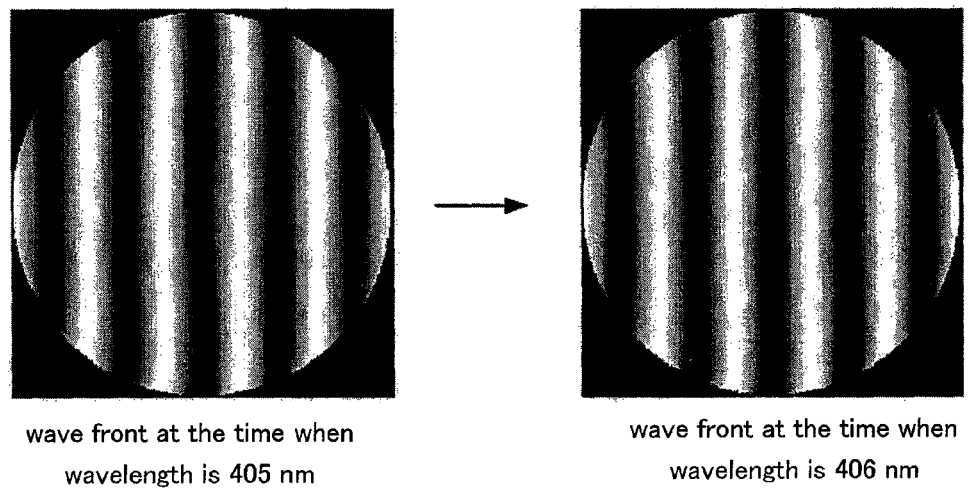
wave front at the time when wavelength is 405 nm
wave front at the time when wavelength is 406 nm
F I G. 2 1
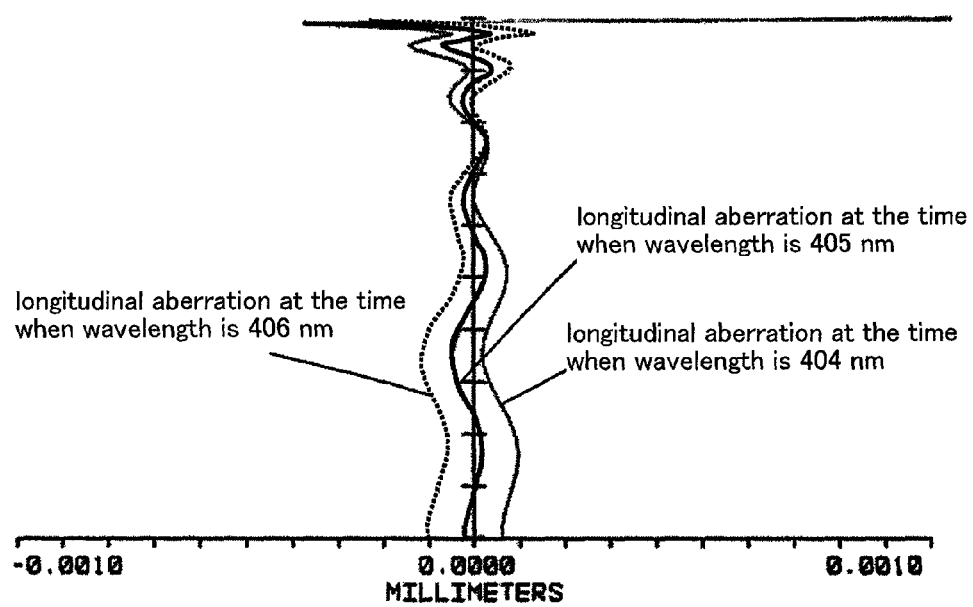

F I G. 2 3
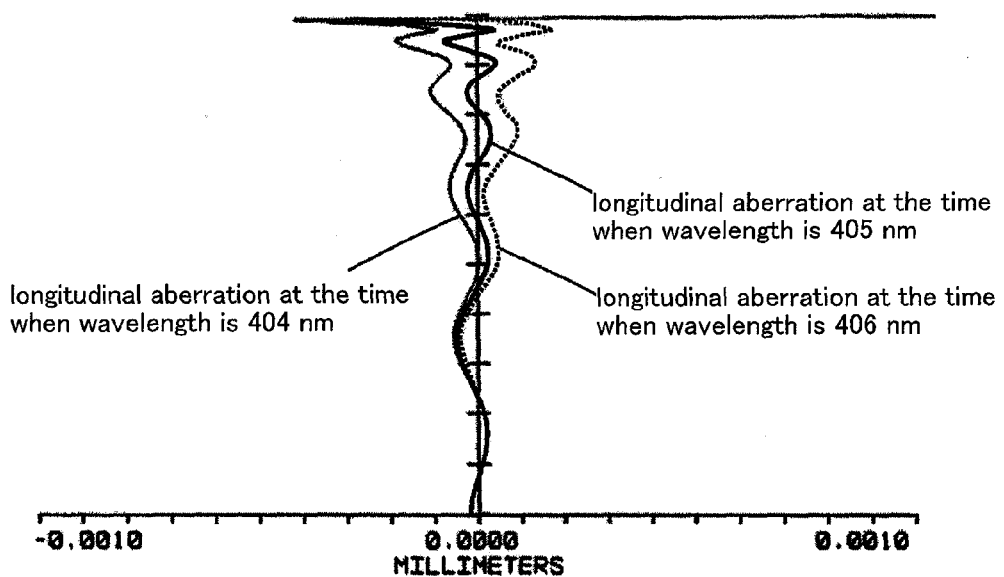
F I G. 2 4
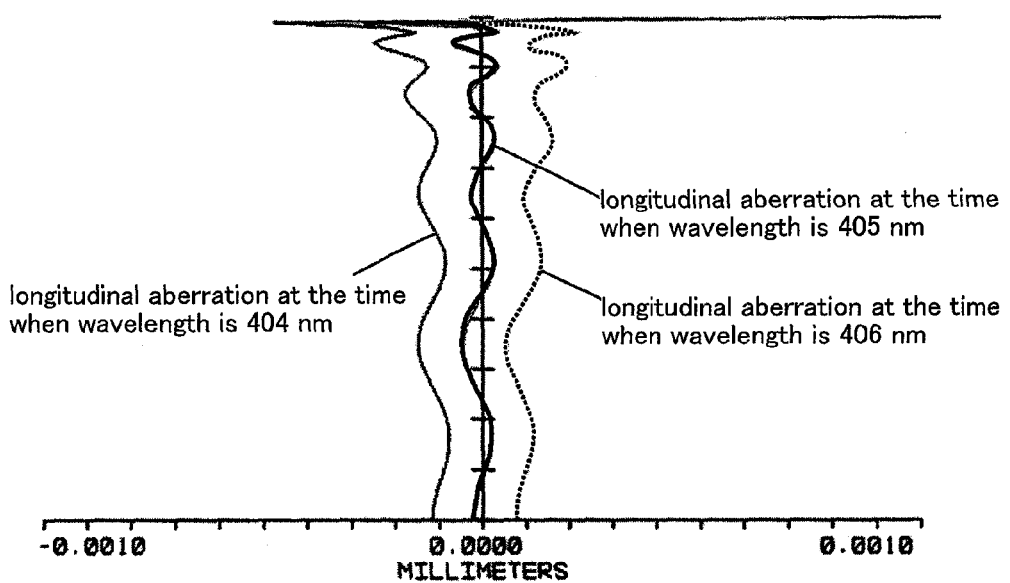

OPTICAL PICKUP DEVICE AND LENS FOR OPTICAL PICKUP

The present application claims priority under 35 USC §119 to Japanese Patent Application No. 2008-307316, filed on Dec. 2, 2008, the entire disclosure of which is incorporated herein by reference.

BACKGROUND OF THE INVENTION

1. Field of the Invention

The present invention relates to an optical pickup device for optically recording and reproducing information and a lens used for optical pickup, and more particularly to a technology for providing a thinner optical pickup device which is shared, in recording and reproducing information, among several types of recording media each having different recording wavelengths and which comprises an achromatic lens for controlling the occurrence of an axial chromatic aberration (appearing more clearly with short wavelengths as a defocused convergent beam on an information recording surface of a disc) in an object lens resulting from wavelength variation triggered by instantaneous changes in optical outputs from a light source due to an operation switchover between recording and reproduction.

The entire documents of Japanese Patent Application No. 2008-307316 including its specification, drawings and Scope of Claims, filed on Dec. 2, 2008, are hereby incorporated by reference in this specification.

2. Description of the Related Art

These days, optical disc devices for optically recording and reproducing information are widespread among consumers; for example, an optical disc device for recording and reproducing various types of information such as video, image and audio using an optical disc such as CD (compact disc), DVD (digital versatile disc) or BD (blue-ray disc) as a recording medium. These optical disc devices available now in the market take various forms. Of the devices, a portable device, a device to be incorporated in a laptop computer and an in-vehicle device, for example, need to be smaller and thinner, and optical pickup devices to be used in these devices naturally need to be smaller and thinner.

Moreover, there has been a strong demand, in recent years, for an optical disc device capable of recording and reproducing information with respect to all of BD, DVD and CD which are three types of recording media each having different specifications. To meet the demand, it is necessary to provide light sources having three different wavelengths in order to record and reproduce information with respect to these three different recording media. In order to converge a light beam on each of the recoding media having three different optical conditions, it is further necessary to provide optical components, for example, lenses and prisms, adjusted to each of the different optical conditions. As a result, it becomes difficult to reduce the size of an optical pickup device to be used in such an optical disc device.

Each of the optical discs, BD, DVD and CD, is basically 12 cm in diameter. Optical disc devices used in portable-type or notebook-type personal computers or in-vehicle optical disc devices mostly use 12 cm-diameter optical discs for recording and reproduction. A disc-radial size of any device (device area) should be unexceptionally large enough to store a disc. Therefore, reducing the device area does not create any added value except for a portable game machine, for example, which uses a small-diameter disc specially designed. Although the disc-radial size and shape of the optical pickup device to be used in the optical disc device slightly vary among optical disc devices and among optical pickup devices, there are established dimensions and shapes generally accepted by the industry. The optical pickup devices supplied by manufactures are, in fact, expected to meet the industrial standard. To supply a value-added device in terms of its size under the circumstances described so far, "a device reduced in thickness" can be a great appealing point.

Until recently, standard notebook computers available in the market were provided with an optical disc device having the thickness of 12.7 mm. Today, thinner notebook computers comprising very thin optical disc devices having the thickness of at most 9.5 mm have been launched and are increasingly appreciated by consumers. These very thin optical disc devices are now faced with the market's request for their adaptability for three different discs, BD, DVD and CD in recording and reproducing information.

An optical pickup device used for recording undergoes an axial chromatic aberration due to wavelength variation in a light source triggered by a difference in output between recording and reproduction operations. When a reproducing operation switches to a recording operation or vice versa, an optical output from a light source instantaneously changes, and a wavelength then correspondingly instantaneously changes. The axial chromatic aberration produced by such an instantaneous wavelength change is presented as a defocused convergent beam on an information recording surface of the disc.

The optical disc device constantly carries out the focus control of an object lens position so that the convergent beam is focused on the information recording surface of the disc. The focus control, which is designed to follow possible surface run-out when the disc is rotated, is limited to a few-kHz band; in other words, the focus control has a limited response speed of the order from a few hundred microseconds to a few milliseconds. However, the optical output from the light source changes so quickly as a nano-second order in the recording-reproduction switchover, which cannot be followed by the focus control. Therefore, the defocus due to the axial chromatic aberration occurs in every recording-reproduction switchover, and the amount of defocus exceeding a system tolerance value results in the deterioration of a recording quality and control stability of the optical disc.

A possible approach for controlling the axial chromatic aberration is to provide a lens made of a material capable of controlling wavelength dispersion. A material capable of controlling wavelength dispersion, however, generally has a small refractive index and thereby has a large lens curvature as compared with a material having a high refractivity. As a result, it becomes difficult to produce a lens having a high numerical aperture NA such as an object lens from the material.

Axial chromatic aberration occurs in a lens of high power, and mainly in an object lens in the case of an optical pickup device. The axial chromatic aberration is more conspicuous as the lens power is higher, in other words, as the numerical aperture NA of the object lens is higher. Optical pickup devices for CD and DVD recording too undergo the axial chromatic aberration. However, the impact of the axial chromatic aberration in these devices, in which the numerical aperture NA of the object lens is not very high, is not as large as any problem is produced in practical use. Therefore, an achromatic lens is generally unnecessary for CD and DVD. On the other hand, an object lens for BD has such a high numerical aperture NA as at least 8.5, and the dispersion of the lens material used therein increases over shorter wavelengths, which makes it difficult to disregard the impact of the defocus due to the axial chromatic aberration. Therefore, optical pickup devices for BD recording conventionally use achromatic lenses.

The achromatic lens is conventionally provided near the object lens for BD (for example, see Disclosed Japanese Patent Document (2002-092926 of the Japanese Patent Applications Laid-Open) because it is easier to assemble the lenses with the centers thereof equally positioned when the lenses are closely disposed than distantly disposed. In the presence of any eccentricity between the positions of the object lens and the achromatic lens, a chromatic difference of magnification generated in the recording-reproduction switchover makes the convergent beam on the information recording surface of the disc instantaneously shift laterally, thereby making the convergent beam off a track center (off-track). The occurrence of the off-track may lead to the deterioration of a recording and reproduction quality and tracking control stability.

The tracking control is conventionally performed by transferring a movable element in which the object lens is housed in a track direction. In such a case, when the recording-reproduction switchover takes place during the shift of the object lens in the case where the achromatic lens is immovably secured and the object lens alone is moved, off-track happens due to the chromatic aberration of magnification as described earlier. It is not possible to follow the off-track caused by the chromatic aberration of magnification by using the tracking control since the off-track takes place at an extremely fast speed far beyond a tracking control band.

There are a variety of known structures of achromatic lenses, and one of the structures particularly well-known is such that a refractive lens having a positive power and a refractive lens having a negative power are bonded. According to this structure, in order to correct the chromatic aberration of the object lens, the chromatic aberration of the bonded lens is excessively corrected (color enhancing) so that the chromatic aberration of the object lens is offset.

However, such a bonded lens is expensive, thick and heavy and unsuitable as a lens to be housed in the movable element which makes very fast and minute movements. In recent years, a lens composed of a diffractive lens and a refractive lens integrally combined has been often used as the achromatic lens in an optical pickup device. The technology relating to the lens is recited, for example, in the Japanese disclosed patent document (2005-322281 of the Japanese Patent Applications Laid-Open; Patent No. 3297505). The refraction-diffraction integrated achromatic lens is less expensive than the bonded lens, and can be produced as a relatively light and thin lens.

Below is described a structure and an operation of an optical pickup device capable of recording and reproducing information with respect to BD, DVD and CD. FIG. 25 is an illustration of a structure of an optical pickup device based on conventional technology. According to the conventional technology, an achromatic lens 20 is provided between a second object lens 13 and a second mirror 12 immediately below the object lens 13. A light beam emitted from a blue-violet semiconductor laser 2 as a second light source, which is a light source to be used for BD, is reflected by a beam splitter 6 and converted by a collimate lens 7 into a substantially parallel light flux. The light flux then passes through a wave plate 8 and a first mirror 9 and is reflected by the second mirror 12. The light flux further passes through the achromatic lens 20 and is converged on a second recording medium (BD) 14 by the second object lens 13. The light beam reflected by the second recording medium 14 traces back the route described so far to finally reach the beam splitter 6. In the return route, the polarization state of the light beam has been changed from that of the outgoing route by an action of the wave plate 8. Therefore, a large portion of the light beam having reached the beam splitter 6 passes therethrough and further passes through a beam splitter 5 and then enters a detection lens 15. The light beam having entered the detection lens 15 enters a light detector 16 with astigmatism applied thereto. The light detector 16 detects various signals for focus, tracking, RF and the like from the incoming light beam.

A light beam emitted from a red semiconductor laser 1a as a first light source, which is a light source to be used for DVD, passes through a diffraction grating 3 and a wave plate 4 and is then reflected by the beam splitter 5. The reflected light passes through the beam splitter 6 and is then converted by the collimate lens 7 into a substantially parallel light flux. The light flux passes through the wave plate 8 and is then reflected by the first mirror 9 to be finally converged on a first recording medium (DVD) 11 by a first object lens 10. The light beam reflected by the first recording medium 11 traces back the route described so far to finally reach the beam splitter 5. In the return route, the polarization state of the light beam has been changed from that of the outgoing route by the action of the wave plate 8. Therefore, a portion of the light beam having reached the beam splitter 5 passes therethrough and then enters the detection lens 15. The light beam having entered the detection lens 15 then enters the light detector 16 with astigmatism applied thereto. The light detector 16 detects various signals for focus, tracking, RF and the like from the incoming light beam.

A light beam emitted from an infrared semiconductor laser 1b as another first light source, which is a light source to be used for CD, is irradiated on a CD recording medium according to an operation similar to that of the DVD optical system described earlier, and the reflected light thereof enters a light detector 1. The light detector 1 detects various signals for focus, tracking, RF and the like from the incoming light beam. As a supplementary explanation, the BD, DVD and CD are loaded in a common loading unit (turn table), and these optical discs are replaced with one another when used.

In the recited structure is used a two-wavelength laser comprising the red semiconductor laser 1a and the infrared semiconductor laser 1b provided in close juxtaposition in a housing. This specification omits the description of the structures of the wave plate 8, first mirror 9, and beam splitters 5 and 6 acting on an optical path to be branched and selected, and the structures of the detection lens 15 and the light detector 16 for detecting the various signals because none of them is a significant constitutive element of the present invention, and many different structures of these elements have so far been publicly known. In FIG. 25, the light sources, beam splitters and light detectors and the like are illustrated on the x-y plane, while a section surrounded by a broken line is illustrated on the y-z plane for convenience.

The optical disc device carries out a focus position control of the object lens because the beam always has to be focused on the information recording surface of the disc even if rotational surface run-out of the disc takes place due to its deflection or mass eccentricity. In the optical pickup device, therefore, it is necessary to ensure a range in the z-axis direction within which the object lens is movable.

In FIG. 25, a thickness direction of the optical pickup device is the z-axis direction, and a height of the BD optical system which occupies a thickness of the optical pickup device is H. The breakdown of the height H are: a working distance WD of the second object lens 13; a lens thickness t1, a thickness t2 of the achromatic lens 20; a required focus movable range d1 of the second object lens 13 for a downward movement; and a light flux diameter φ before the reflection on the second mirror 12. It is necessary in practice to allow for a clearance between the second object lens 13 and the achromatic lens 20 and a clearance between movable and immovable units in addition to the before-mentioned elements; however, a description hereinafter given is based on the following equation.

$$H = WD + t1 + t2 + d1 + \phi \quad [1]$$

A key factor in reducing the thickness of the optical pickup device is how to reduce the height H to the minimum. It is obvious that the BD optical system provided with achromatic lenses 20, as compared with the DVD/CD optical system, has a disadvantage in the pursuit of thinning its optical pickup device. Therefore, in an optical pickup device for BD recording in which achromatic lenses 20 are indispensable, it is an effective design measure to reduce the light flux diameter φ. However, such a measure involves reduction of a diameter of the object lens for BD, consequently leading to the reduction in the working distance WD. The less working distance WD increases the risk of collision between the disc and the object lens. That is a demerit of this measure.

In an optical disc device, tracking control is conventionally performed to follow the disc eccentricity, wherein the object lens is shifted in the track direction (radial direction of optical disc). When the diameters of the light flux and the object lens are made smaller, the amount of the shift of the object lens with respect to the light flux diameter increases, which may lead to the deterioration of an optical performance at the time of the lens shift and performance of the tracking control.

As described so far, it is important to reduce the height H of the optical system while ensuring the light flux diameter φ as large as possible, in order to realize a very thin high-performance optical pickup device. In an optical pickup device to be used in a very thin optical disc device having the thickness of 9.5 mm (hereinafter, referred to as a very thin optical pickup device), for example, its height H is required to be at most about 5 mm. An anticipated eccentricity of a 12-cm optical disc device is desired to be about 0.2 mm. The light flux diameter φ needs to be at least about 2 mm, otherwise, the optical performance at the time of the lens shift and the tracking control performance are more evidently deteriorated.

Assuming that φ=2 mm and the numerical aperture NA of the second object lens 13 is 0.85, a focal distance of the second object lens 13 is φ/(2/NA)=2/(2/0.85)=1.18 mm. When an object lens having the focal distance of 1.18 mm and the numerical aperture NA of 0.85 is designed using a generally adopted glass material, the thickness t1 of the lens is approximately 1.6 mm, and the working distance WD thereof is approximately 0.3 mm. As a result of the subtraction of these values with H=5 mm set as a target, (d1+t2)=H−φ−t1−WD=5−2−1.6−0.3=1.1 mm. Thus, the value allocated to d1 and t2 is 1.1 mm or less. The required focus movable range d1 of the second object lens 13 for downward movement desirably has a value of approximately 1 mm. Assuming that d1=1.0 mm, 0.1 mm is finally left for t2. An achromatic lens 20 having the thickness of 0.1 mm is too thin a lens and is unrealistic. In fact, it is necessary to allow for inter-component clearances and a dimensional tolerance in assembling the components, which eventually leaves less than 0.1 mm for the thickness t2 of the achromatic lens 20. As thus far described, it is practically impossible in a very thin optical pickup device to provide an achromatic lens 20 immediately below the second object lens 13 while ensuring the light flux having a desired value.

SUMMARY OF THE INVENTION

Therefore, a main object of the present invention is to provide a very thin high-performance optical pickup device comprising an achromatic function wherein a desired light flux diameter can be assured.

An optical pickup device according to the present invention comprises:

a first mirror for reflecting a first light beam outputted from a first light source and letting a second light beam outputted from a second light source pass therethrough;

a first object lens for converging the first light beam reflected by the first mirror on an information recording surface of a recording medium;

a second mirror for reflecting the second light beam passing through the first mirror;

a second object lens for converging the second light beam reflected by the second mirror on the information recording surface of the recording medium; and an achromatic lens for correcting an axial chromatic aberration of the second object lens generated by wavelength variation of the second light beam, wherein the achromatic lens is provided in an optical path between the first mirror and the second mirror.

A lens for optical pickup according to the present invention is a lens for optical pickup to be loaded in an optical pickup device for recording and reproducing information with respect to a recording medium, comprising: a first mirror for reflecting a first light beam outputted from a first light source toward a first object lens facing an information recording surface of the recording medium; and a second mirror for reflecting a second light beam outputted from a second light source and passing through the first mirror toward a second object lens facing the information recording surface of the recording medium, wherein the lens for optical pickup is provided in an optical path between the first mirror and the second mirror, and the lens for optical pickup comprises an achromatic function for correcting an axial chromatic aberration of the second object lens generated by wavelength variation of the second light beam.

The constitutions thus provided have the following characteristics: The achromatic lens is provided at a position different to that of the conventional technology. The achromatic lens is disposed immediately below the second object lens between the second object lens and the second mirror in the conventional technology, while the achromatic lens is provided between the first mirror and the second mirror according to the present invention. The conventional technology is characterized in that the achromatic lens is present in the optical path along an optical axis of the second object lens. According to the present invention, however, the achromatic lens is not present in the optical path along the optical axis of the second object lens. A height of the optical pickup device represents a range dedicated to the second object lens along the optical axis. According to the present invention, wherein the achromatic lens is provided outside of the dedicated range of the second object lens in the optical-axis direction which is associated with the height of the optical pickup device, the height of the optical pickup device can be reduced by the thickness of the achromatic lens. Namely, the optical pickup device can be reduced in thickness. Along with the advantage, the achromatic lens whose existence is secured still serves to control the axial chromatic aberration (appearing more clearly in the case of short wavelengths as a defocused convergent beam on the information recording surface of the disc) generated in the object lens resulting from the wavelength variation triggered by instantaneous changes of the light source output at the time of switchover between reproduction and recording.

Another possible location of the achromatic lens seems to be a space immediately behind the second light source. In the case where the achromatic lens is thus positioned, however, the axial chromatic aberration, if any, changes a relationship between a beam-convergent state of the second recording medium and a beam-convergent state of the light detector because the achromatic lens can act only on light in an outgoing route. As a result, a focus control error is possibly generated, undermining a recording quality and control stability. Such a risk can be prevented when the achromatic lens is disposed in the optical path between the first mirror and the second mirror.

According to a preferable mode of the optical pickup device and the lens for optical pickup having the constitution described earlier, an outer diameter Lx of the achromatic lens in x direction and an outer diameter Lz thereof in z direction have a relationship of Lx>Lz, and the z direction corresponds to a thickness direction of the optical pickup device. The x direction is a disc-radius direction. The second object lens is configured to move in the disc-radius direction for the tracking control that follows a rotational eccentricity of the optical disc (recording medium). Therefore, it is necessary for the achromatic lens to have such an effective diameter that covers the shift of the second object lens in the disk-radial direction, and the longitudinal dedicated range is increased in the case where the achromatic lens is formed in the shape of a true circle. However, the second object lens cannot move in a track-tangent direction, which makes it unnecessary for the effective diameter of the achromatic lens in the height direction to cover the shift of the second object lens. Accordingly, the height-associated effective diameter of the achromatic lens can be reduced by a dimension of the tracking movable range of the second object lens as compared with a disc-radial effective diameter (diameter of a true circle). As a result, the height of the achromatic lens can be reduced, which is advantageous in providing a very thin optical pickup device.

According to another preferable mode of the optical pickup device and the lens for optical pickup having the constitution described earlier, the achromatic lens comprises a diffractive surface and a concave surface, wherein the concave surface is disposed on the first-mirror side. The concave surface may be referred to as a refractive surface. Contrary to the above, the diffractive surface may be disposed on the first-mirror side. The concave surface (refractive surface) has a negative power, while the diffractive surface has a positive power. When the achromatic lens is provided with the negative concave surface (refractive surface) on the first-mirror side and the positive diffractive surface on the second-mirror side, the optical path to the achromatic lens can have a diameter smaller than that of a light flux entering the object lens. As a result, the height of the optical system to be provided in a base unit of the optical pickup device can be reduced, which is advantageous in providing a very thin optical pickup device.

According to still another preferable mode of the optical pickup device and the lens for optical pickup having the constitution described earlier, an numerical aperture NA of the second object lens is substantially at least 0.85, and a focal distance thereof is at least 1.0 and at most 1.3 mm. The object lens having such a high numerical aperture NA as substantially at least 0.85 is suitable as an object lens for BD in which very short wavelengths are used. The recited value, substantially 0.85, set based on the specifications of the object lens for BD represents a numerical concept including not only the exact 0.85 but also its error range, 0.84-0.86.

In the case where the focal distance of the second object lens is further reduced to smaller than 1.0 mm, the working distance WD thereof is also reduced, which increases the risk of collision between the object lens and the recording medium. Therefore, it is practically undesirable to reduce the focal distance of the second object lens to smaller than 1.0 mm. The thickness of the second object lens increases with the increase of the focal distance. Though a summed value of the thickness of the second object lens and its focus movable range is preferably smaller, the focus movable range can only be controlled within a limited range, and an upper limit value of the thickness of the second object lens representing its focal distance is naturally subject to limitation. The upper limit value is preferably set to 1.3 mm; however, values exceeding 1.3 mm may be set as the focal distance of the object lens.

According to still another preferable mode of the optical pickup device having the constitution described earlier, a center thickness of the achromatic lens is at most 1 mm.

According to still another preferable mode of the optical pickup device having the constitution described earlier, a distance between centers of the first object lens and the second object lens is at most 5.4 mm. The distance of at most 5.4 mm between the object lenses is determined by a relationship between an innermost peripheral radius (approximately 22 m) and an outermost peripheral radius (approximately 57 mm) of the information recording surface of the optical disc. A tracking direction (shaft transfer azimuth) of the optical pickup device is preferably in parallel with the radial direction of the optical disc. In many cases, the first object lens for DVD and CD associated with relatively long wavelengths is disposed on a disc normal corresponding to the shaft transfer direction of the optical pickup device, while the second object lens for BD associated with relatively short wavelengths is disposed at a position distant from the normal. This is because a 3-beam tracking control method is conventionally employed in DVD and CD, and an error signal quality is highly dependent on an angle made by azimuths of the three aligned beams and the track tangent. A 1-beam tracking control method is commonly used for BD. A center of the first optical lens is set so that a normal direction which connects the center to the disc center is in parallel with the tracking direction (shaft transfer azimuth) of the optical pickup device. Then, with regard to the first object lens, the angle made by the beam azimuth on the disc surface and the track-tangent azimuth remains unchanged over the distance from an outermost peripheral position to an innermost peripheral position. In contrast, in the case of the second object lens which is displaced in the track-tangent direction from the first object lens disposed on the normal, the angle made by the beam azimuth on the disc surface and the track-tangent azimuth changes over the distance from the outermost peripheral position to the innermost peripheral position. In the 1-beam tracking control method for the second object lens, the error signal quality is not very dependent on the angle made by the beam azimuth and the track-tangent azimuth. Therefore, the device is practicable even if the object lens is offset relative to the disc normal.

According to still another preferable mode of the optical pickup device and the lens for optical pickup having the constitution described earlier, a relationship in the second light source between an axial chromatic aberration So of the second object lens generated by a difference between a wavelength in recording information and a wavelength in reproducing the information and an axial chromatic aberration Sa to be corrected by the achromatic lens is $0.3 \times So \leq Sa \leq 0.7 \times So$. When the amount of the axial chromatic aberration to be corrected by the achromatic lens is controlled, the offset due to the chromatic difference of magnification is reduced. It is important to obtain a practically good balance between the axial chromatic aberration to be corrected and the off-track due to the chromatic difference of magnification, taking into consideration outputs and characteristics of a light source to be used, an anticipated disc eccentricity, and a system tolerance for defocus and off-track from a comprehensive standpoint. Therefore, the axial chromatic aberration to be corrected by the achromatic lens is controlled in the range of 30%-70% of the axial chromatic aberration So generated in the object lens. Accordingly, a very thin optical pickup device having a remarkable practicability can be obtained.

The present invention, while ensuring a desired light flux diameter, can successfully reduce the thickness of an optical pickup device, by providing an optical pickup device which is used for recording and reproducing information with respect to a plurality of recording media each having different recording wavelengths and which comprises an achromatic lens for controlling an axial chromatic aberration generated in an object lens due to wavelength variation resulting from instantaneous changes of an optical output of a light source at the time of switchover between the recording and reproduction.

The present invention provides a distinctly advantageous technology for thinning an optical pickup device while ensuring a desirable light flux diameter, by providing an optical pickup device which is used for recording and reproducing information with respect to a plurality of recording media each having different recording wavelengths and which comprises an achromatic lens for controlling an axial chromatic aberration generated in an object lens due to wavelength variation resulting from instantaneous changes of an optical output of a light source at the time of switchover between the recording and reproduction. In particular, the prevent invention is useful because it is applied to an optical disc drive compatible with either CD or DVD, or both, and BD (Blue-ray disc), loaded on an optical pickup device incorporated in a portable-type or notebook-type personal computer, an in-vehicle device and the like.

The present invention provides a distinctly useful technology in producing a very thin high-function, high-performance optical pickup device wherein positions of first and second object lenses are set so that an interval therebetween can stay within a preferable range, and an off-track due to a chromatic difference of magnification is controlled within such a low level that no practical problems can occur.

BRIEF DESCRIPTION OF THE DRAWINGS

These and other objects of the invention will become clear by the following description of preferred embodiments of the invention and will be clear described in the claims attached hereto. A number of benefits not recited in this specification will come to the attention of the skilled in the art upon the implementation of the present invention

FIG. 3A is a front view of an achromatic lens according to the preferred embodiment viewed in y direction (a truck-tangent direction).

FIG. 3B is a side view of the achromatic lens according to the preferred embodiment viewed in x direction (a disc-radius direction).

FIG. 3C is a perspective view illustrating a positional relationship among the achromatic lens, a second mirror and a second object lens.

FIG. 4 is a drawing illustrating a constitution of a refraction-diffraction integrated achromatic lens according to the preferred embodiment.

FIG. 5 is a drawing illustrating another constitution of the refraction-diffraction integrated achromatic lens according to the preferred embodiment.

FIG. 6 is an illustration of a longitudinal aberration of an object lens (Table 1 and Table 5) according to the preferred embodiment.

FIG. 7 is an illustration of a transmitted wave front of the object lens (Table 1 and Table 5) according to the preferred embodiment.

FIG. 12 is an illustration of a transmitted wave front of the object lens (Table 1 and Table 5) according to the preferred embodiment.

FIG. 13 is an illustration of color enhancing by an achromatic lens (Table 3) according to the preferred embodiment.

FIG. 16 is a drawing illustrating structural elements of the optical pickup device according to the preferred embodiment.

FIG. 20 is an illustration of an achromatic effect (wave front) exerted by a constitution of Table 5 according to the preferred embodiment.

FIG. 21 is an illustration of an achromatic effect (longitudinal aberration) exerted by the constitution of Table 5 according to the preferred embodiment.

FIG. 23 is an illustration of an achromatic effect (longitudinal aberration) exerted by a constitution of Table 6 according to the preferred embodiment.

FIG. 24 is an illustration of an achromatic effect (longitudinal aberration) exerted by a constitution of Table 7 according to the preferred embodiment.

DETAILED DESCRIPTION OF THE INVENTION

Figure 1:
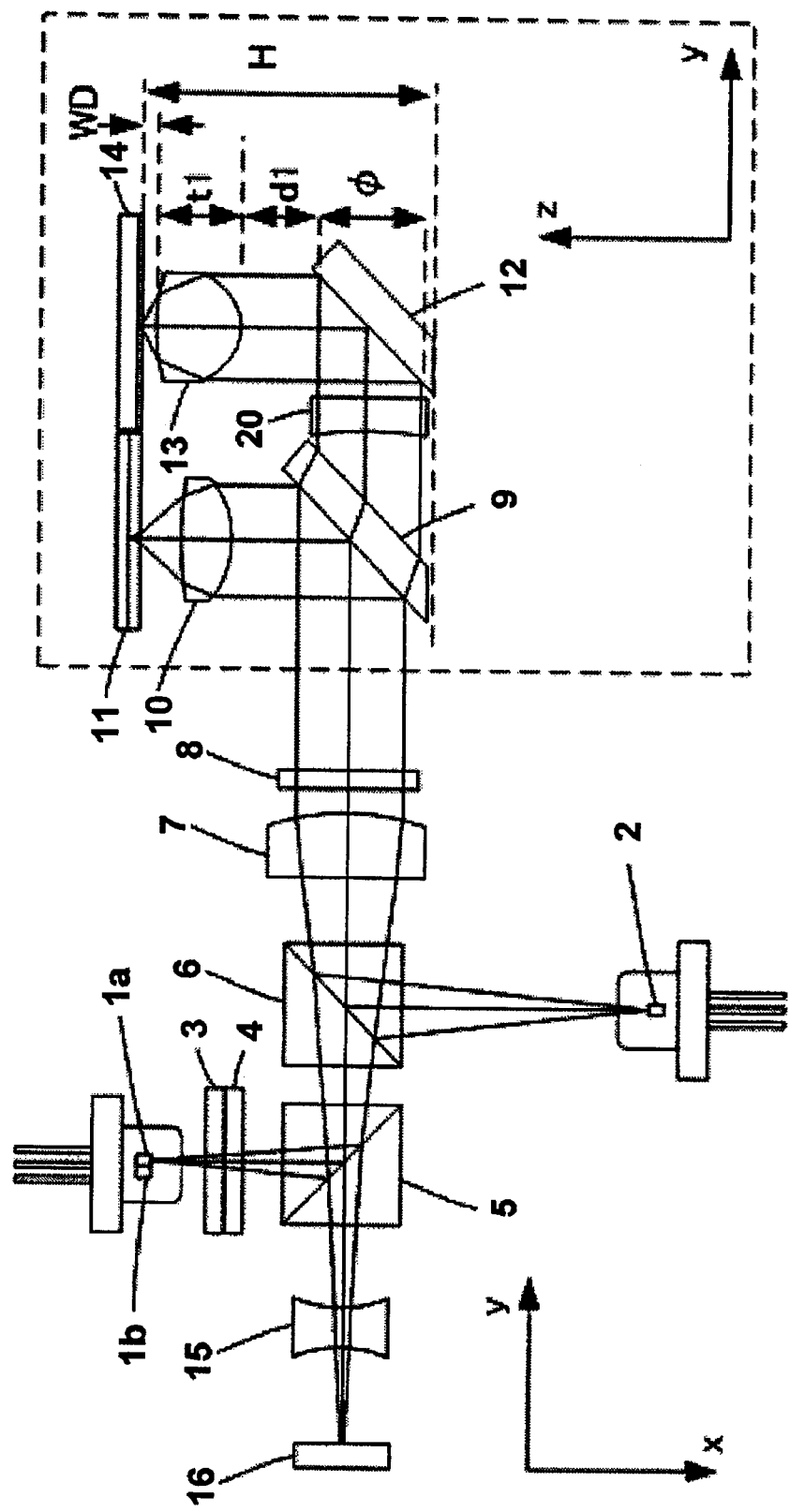
FIG. 1 is a drawing illustrating a constitution of an optical pickup device according to a preferred embodiment of the present invention.

Hereinafter, a preferred embodiment of the present invention is described referring to the drawings. The same reference symbols shown in the drawings denote identical or equivalent structural elements. FIG. 1 is a drawing illustrating a constitution of an optical pickup device according to the preferred embodiment. The present preferred embodiment is characterized in that an achromatic lens 20 is provided between a first mirror 9 and a second mirror 12.

The reference symbols shown in FIG. 1 are described below. 1a denotes a red semiconductor laser as a first light source (light source for DVD). 1b denotes an infrared semiconductor laser as another first light source (light source for CD). 2 denotes a blue-violet semiconductor laser as a second light source (light source for BD). 3 denotes a diffraction grating, 4 denotes a wave plate, 5 denotes a beam splitter, 6 denotes a beam splitter, 7 denotes a collimate lend, and 8 denotes a wave plate. 9 denotes a first mirror, 10 denotes a first object lens, 11 denotes a first recording medium (DVD or CD), and 12 denotes a second mirror. 13 denotes a second object lens, 14 denotes a second recording medium (BD), 15 denotes a detection lens, 16 denotes a light detector, and 20 denotes an achromatic lens.

The optical pickup device according to the present preferred embodiment comprises the first mirror 9 for reflecting a first light beam emitted from the first light sources 1a and 1b and letting a second light beam from the second light source 2 pass therethrough, a first object lens 10 for converging the first light beam reflected by the first mirror 9 on the first recording medium 11, the second mirror 12 for reflecting the second light beam passing through the first mirror 9, the second object lens 13 for converging the second light beam reflected by the second mirror 12 on the second recording medium 14, and the achromatic lens 20 for correcting an axial chromatic aberration of the second object lens 13 generated by wavelength variation of the second light beam. The optical pickup device according to the present preferred embodiment is further characterized in that the achromatic lens 20 is provided in an optical path between the first mirror 9 and the second mirror 12.

A light beam emitted from the blue-violet semiconductor laser 2 as a second light source (light source for BD) is reflected by the beam splitter 6 and converted into a substantially parallel light flux by the collimate lens 7. The light flux passes through the wave plate 8, first mirror 9 and then achromatic lens 20, and is reflected by the second mirror 12 and converged on the second recording medium 14 by the second object lens 13. The light beam reflected by the second recording medium 14 traces back the route described so far to finally reach the beam splitter 6. In the return route, the polarization state of the light beam has been changed from that of the outgoing route by an action of the wave plate 8. Therefore, a large portion of the light beam having reached the beam splitter 6 passes therethrough and further passes through the beam splitter 5 and then enters the detection lens 15. The light beam having entered the detection lens 15 enters the light detector 16 with astigmatism applied thereto, and then, various signals for focus, tracking, RF and the like are detected from the light beam having entered the light detector 16. This specification omits the description of DVD and CD optical systems which operate in the same manner as the conventional example.

When the achromatic lens 20 is thus disposed between the first mirror 9 and the second mirror 12, the height H of the BD optical system is, $$H = WD + t1 + d1 + \phi \qquad 2)$$

Applying the parameters used in the conventional example thereto, H=0.3+1.6+1+2=4.9. It is found that an optical system having the height of 5 mm or less can be realized. It should be noted that $H=WD+t1+t2+d1+\phi$ according to the conventional technology, while the thickness t2 of the achromatic lens 20 is not included in the present preferred embodiment.

In the example illustrated in FIG. 1, the achromatic lens 20 exerts its action on both of the outgoing route from the second light source 2 to the second recording medium 14 and the return route from the second recording medium 14 to the light detector 16, just as in the case of the conventional example. Therefore, the relationship between a beam-convergent state of the second recording medium 14 and a beam-convergent state of the light detector 16 is made always remain unchanged. As another seemingly possible location of the achromatic lens 20 in the optical path for BD, a space between the second light source 2 and the beam splitter 6 is cited. The achromatic lens provided in the space, however, acts only on the light of the outgoing route. Therefore, the axial chromatic aberration, when generated, changes the relationship between the beam-convergent state of the light detector 16 and the beam-convergent state of the second recording medium 14. As a result, a focus control error thereby generated may adversely impact on a recording quality and control stability.

Figure 2:
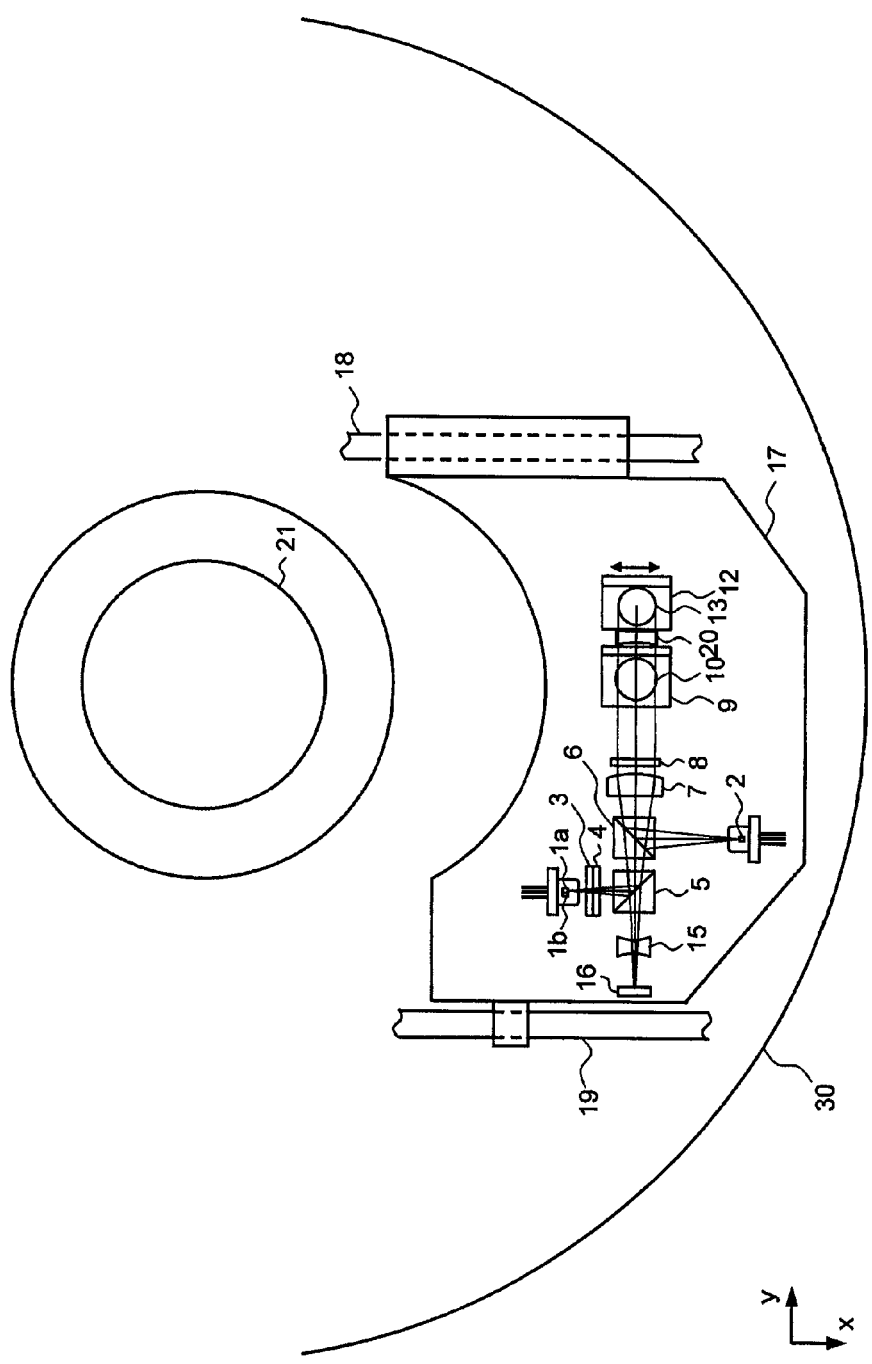
FIG. 2 is a layout drawing of the optical pickup device according to the preferred embodiment and an optical disc.

FIG. 2 is a layout drawing of an optical pickup device and an optical disc. An optical pickup device 17 is supported by a main shaft 18 and a sub shaft 19 and is configured to move from an inner periphery to an outer periphery of an optical disc 30. The optical disc 30 is a collective term of three different types of recording media each having their respective specifications: BD, DVD and CD. The optical disc 30 is clamped on a turn table 21 and rotated by a disc motor. The second object lens 13 is configured to shift in x direction in the drawing (disc-radius direction) in order to follow an eccentricity at the time of the rotation of the optical disc 30. Therefore, it is necessary for the achromatic lens 20 to have such an effective diameter that covers the shift of the second object lens 13 in the x direction. However, the second object lens 13 is immovable in y direction in the drawing (track-tangent direction). Therefore, the effective diameter of the achromatic lens 20 in z direction can be smaller with respect to the effective diameter thereof in the x direction by a dimension corresponding to a tracking movable range of the second object lens 13.

FIGS. 3A-3C illustrate an structural example of the achromatic lens 20 in which the described advantage is utilized. FIG. 3A is a front view of the achromatic lens 20 viewed in the y direction (track-tangent direction), FIG. 3B is a side view thereof viewed in the x direction (disc-radius direction), and FIG. 3C is a perspective view illustrating a positional relationship among the achromatic lens 20, second mirror 12 and second object lens 13.

The required effective diameter of the achromatic lens 20 in the x direction (disc-radius direction) is referred to as Lx. Then, the achromatic lens 20 has such a shape that top and bottom portions of a circular lens whose diameter is Lx are cut off so that a height thereof is Lz (Lx>Lz). A difference between Lx and Lz corresponds to the tracking movable range of the second object lens 13. To obtain the achromatic lens 20, upper and bottom portions of a formed Lx-diameter circular disc may be cut, or a mold designed to form the shape illustrated in FIGS. 3A-3C can be prepared. Accordingly, the height of the achromatic lens 20 in the thickness direction of the optical pickup device 17 can be reduced without losing the required effective diameter. The achromatic lens thus obtained has a very advantageous shape in constituting the very thin optical pickup device 17.

Below is given a discussion of an optical action of the achromatic lens 20. A refractive object lens is more likely to cause an axial chromatic aberration in a direction at which a focal point is extended as a light source wavelength is longer. This is because long wavelengths reduce the refractive index of lens materials. This characteristic is common to glass materials and resin materials. When the refractivity is lower, the power of the lens is lower, resulting in the focal point extension. On the other hand, a diffraction grating increases a diffraction power over long wavelengths. A diffractive achromatic lens exerts its achromatic effect by utilizing the fact that as far as the wavelength-dependency of power is concerned, there is an inverse relationship between diffraction and refraction. In order to correct the axial chromatic aberration generated in the object lens, a light flux entering the object lens is caused to converge more than usual when wavelengths are longer than standard wavelength and is caused to diverge more than usual when wavelengths are shorter than standard wavelength. As a struction of the refraction-diffraction integrated achromatic lens thus characterized, the following structures are considered: S1 is used as a refractive surface of a concave lens so as to have a negative power, and S2 is used as a diffractive surface so as to have a positive power as illustrated in FIG. 4, or S1 is used as the diffractive surface and S2 is used as the refractive surface of the concave lens as illustrated in FIG. 5. In either case, the light flux can be caused to converge more in the case of longer wavelengths and diverge more in the case of shorter wavelengths. The achromatic lens thus characterized also has the effect of creating a difference between an incident light flux diameter and an emitting light flux diameter. In FIGS. 4 and 5, the refraction in the optical path is disregarded, and the second mirror 12 is omitted.

The achromatic lens 20 of FIG. 4 enables the formation of an optical path extending thereto having a smaller diameter than that of the light flux entering the second object lens 13. As a result, the height of the optical system in the base unit in the optical pickup device 17 can be reduced. Thus, the achromatic lens 20 is very effective in providing a very thin optical pickup device.

As an implementation example, Tables 1 and 2 show specific numeral values of the achromatic lens 20 illustrated in FIG. 4.

TABLE 1

| parameter | | | value | unit |
|---|---|---|---|---|
| parameters of achromatic lens | ta(center thickness of achromatic lens) | | 1 | mm |
| | dia.a | | 1.614 | mm |
| | S1 | curvature radius | −5.4 | mm |
| | | conical constant | 0 | — |
| | S2 | curvature radius | ∞ | mm |
| | | conical constant | 0 | — |
| | | phase function A2 | −705.4252 | rad |
| | | A4 | −1.5410087 | rad |
| parameters of object lens | t1 | | 1.382 | mm |
| | φ | | 1.714 | mm |
| | focal distance of object lens | | 1.0 | mm |
| | object lens NA | | 0.85 | — |
| | S3 | curvature radius | 0.731772 | mm |
| | | conical constant | −0.590443 | — |
| | | asphericity #4 | 0.042751594 | |
| | | #6 | 0.083277635 | |
| | | #8 | −0.43075824 | |
| | | #10 | 2.1240263 | |
| | | #12 | −5.3128764 | |
| | | #14 | 6.6920009 | |
| | | #16 | −3.460594 | |
| | S4 | curvature radius | −1.15632 | mm |
| | | conical constant | 0 | — |
| | | asphericity #4 | 5.1162517 | |

TABLE 1-continued

| parameter | value | unit |
|---|---|---|
| #6 | −55.609568 | |
| #8 | 468.95506 | |
| #10 | −2752.1432 | |
| #12 | 10176.821 | |
| #14 | −21100.783 | |
| #16 | 18641.243 | |
| WD | 0.231 | mm |
| substrate thickness of recording medium | 0.070 | mm |

TABLE 2

| | | wavelength [nm] | | |
|---|---|---|---|---|
| | | 404 | 405 | 406 |
| refractive index | achromatic lens | 1.52212705 | 1.52243111 | 1.52212705 |
| | object lens | 1.62374703 | 1.62409022 | 1.62374703 |
| | substrate of recording medium | 1.61704081 | 1.61767489 | 1.61704081 |

In the present example, an axial chromatic aberration So of the object lens alone observed when the wavelength changed from 405 nm by 1 nm was 0.19 μm. FIG. 6 is an illustration of longitudinal aberrations, and FIG. 7 is an illustration of wave-front states. In these drawings, a lateral axis denotes a length in an optical-axis direction, and its origin is an axial image point with 405 nm as a standard wavelength, and a longitudinal axis denotes a radius of a parallel light flux entering the achromatic lens 20, and an effective diameter is used for standardization when the radius is measured. In FIG. 6, the axial chromatic aberration So corresponds to a distance between curved lines of the wavelengths on the lateral axis.

Figure 8:
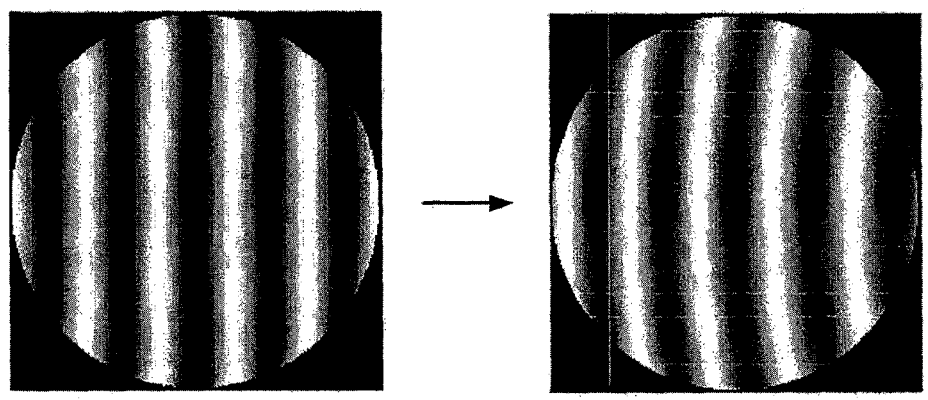
FIG. 8 is an illustration of color enhancing by the achromatic lens (Table 1) according to the preferred embodiment.
Figure 9:
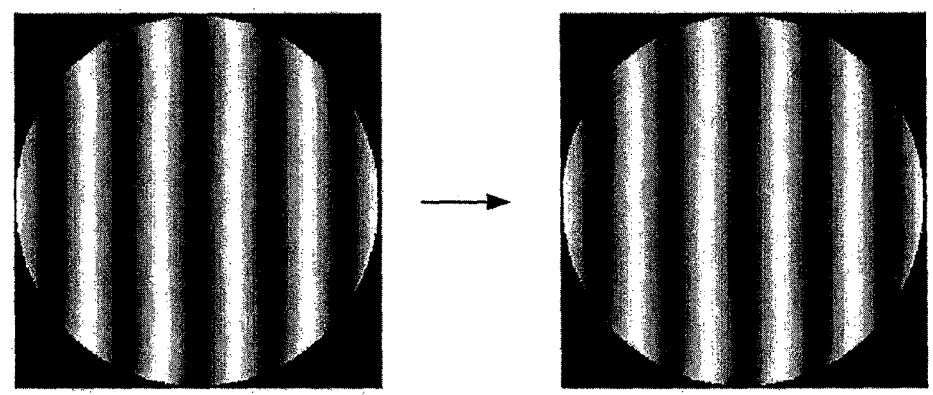
FIG. 9 is an illustration of an achromatic effect (wave front) exerted by a constitution of Table 1 according to the preferred embodiment.
Figure 10:
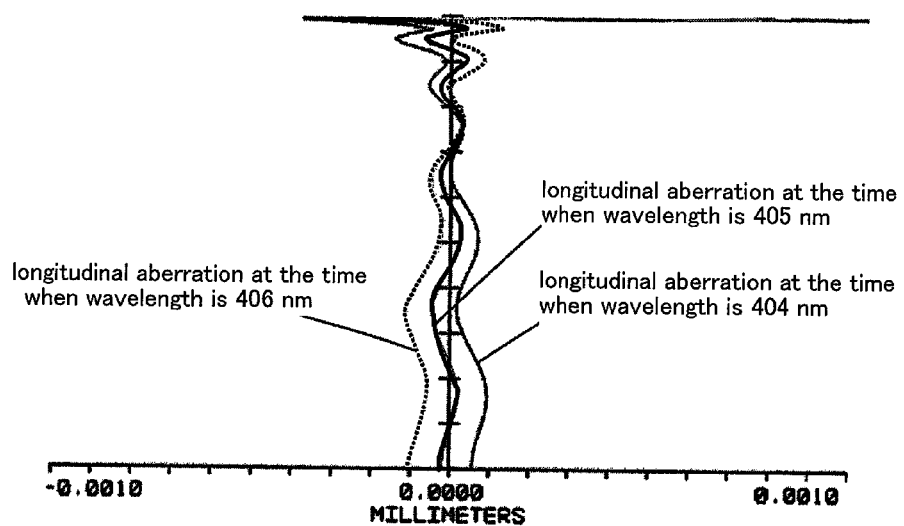
FIG. 10 is an illustration of an achromatic effect (longitudinal aberration) exerted by the constitution of Table 1 according to the preferred embodiment.

It is known from FIG. 7 that interference fringes are deflected by the axial chromatic aberration when a wavelength changes. It is generally known that when a wave-front aberration is decomposed by the Zernike polynomial, a defocus corresponds to the fourth member $(2\rho^2-1)$. The defocus of the wave front obtained from the fourth member was around 66 mλ. The achromatic lens 20 was designed so that an aberration coefficient variation thereof would become equal thereto, 66 mλ, in a direction opposite to the second object lens 13 (FIG. 8). When these two lenses are combined at their respective positions as illustrated in FIG. 4, the wave front variation resulting from the wavelength variation substantially disappears as illustrated in FIG. 9. Then, a mean value of the longitudinal aberrations is substantially zero during the wavelength variation as illustrated in FIG. 10. Thus, it is learnt that the axial chromatic aberration (defocus) does not occur, and φ−dia.a=1.714−1.614=0.100 mm is obtained then. The light flux entering the achromatic lens 20 can have a diameter smaller by 0.1 mm than that of the incident light flux with respect to the second object lens 13. The phase function of the diffractive surface S2 indicated here is defined by the following formula [3].

$$\phi = A2 \times p^2 + A4 \times p^4 \quad [3]$$

In the formula [3], A2 and A4 denote coefficients (radian) of $p^2$ and $p^4$ as normalized radial aperture coordinates.

The height H of the BD optical system then is H=WD+t1+d1+φ=0.231+1.382+1+1.714=4.327 mm, which is smaller than the targeted height value of the optical system, 5 mm. Therefore, a very thin optical pickup device can be thereby obtained. The targeted height value described here of the optical system, 5 mm, is set based on the specification of the numerical aperture NA in the BD optical system (NA 0.85).

The second object lens 13 used in the present example has the focal distance of 1.0 mm. When the focal distance of the second object lens 13 becomes smaller than 1.0 mm, the values of WD, t1 and φ becomes further smaller, which leaves a further allowance in designing the device height. However, as described in the Background of the Invention, a decrease in the working distance WD has the disadvantage of increasing the risk of collision between the disc and the object lens, and a decrease in the light flux diameter φ invites the deterioration of the optical performance and tracking control performance during the lens shift. With these possible problems in mind, the focal distance of the second object lens 13 is preferably set to at least 1.0 mm. It is, however, a matter of course that the focal distance of the second object lens 13 can be set at a value less than 1.0 mm as far as the risk of collision between the disc and the object lens can be avoided, and the deterioration of the optical performance and tracking control performance during the lens shift can stay within a tolerance.

Consideration is given as below to possible upper-limit values in the case where 1.0 mm is set as a lower limit of the focal distance of the second object lens 13. Table 3 below shows an implementation example having possible specific upper-limit numeral values.

TABLE 3

| | parameter | | value | unit |
|---|---|---|---|---|
| parameters of achromatic lens | ta(center thickness of achromatic lens) | | 1 | mm |
| | dia.a | | 2.131 | mm |
| | S1 | curvature radius | −7.4 | mm |
| | | conical constant | 0 | — |
| | S2 | curvature radius | ∞ | mm |
| | | conical constant | 0 | — |
| | | phase function  A2 | −523.20818 | rad |
| | | A4 | −0.65436974 | rad |
| parameters of object lens | t1 | | 1.796 | mm |
| | φ | | 2.229 | mm |
| | focal distance of object lens | | 1.3 | mm |
| | object lens NA | | 0.85 | — |
| | S3 | curvature radius | 0.951304 | mm |
| | | conical constant | −0.590443 | — |
| | | asphericity  #4 | 0.019459078 | |
| | | #6 | 0.022429088 | |
| | | #8 | −0.068648353 | |
| | | #10 | 0.20029482 | |
| | | #12 | −0.29645094 | |
| | | #14 | 0.22094919 | |
| | | #16 | −0.067608354 | |
| | S4 | curvature radius | −1.503217 | mm |
| | | conical constant | 0 | — |
| | | asphericity  #4 | 2.3287445 | |
| | | #6 | −14.977273 | |
| | | #8 | 74.735641 | |
| | | #10 | −259.52599 | |
| | | #12 | 567.85214 | |
| | | #14 | −696.68265 | |
| | | #16 | 364.18712 | |
| | WD | | 0.301 | mm |
| substrate thickness of recording medium | | | 0.091 | mm |

Figure 11:
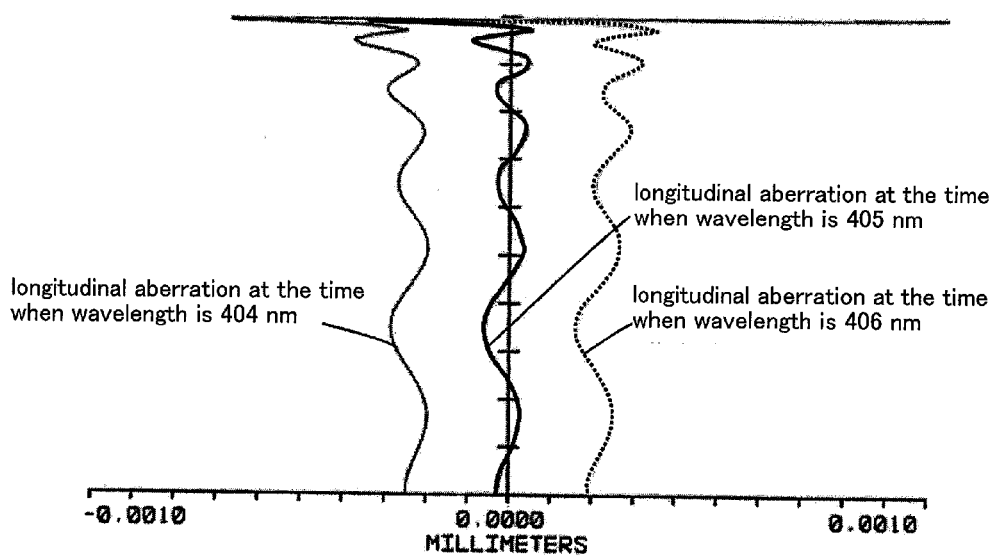
FIG. 11 is an illustration of a longitudinal aberration of an object lens (Table 3) according to the preferred embodiment.
Figure 14:
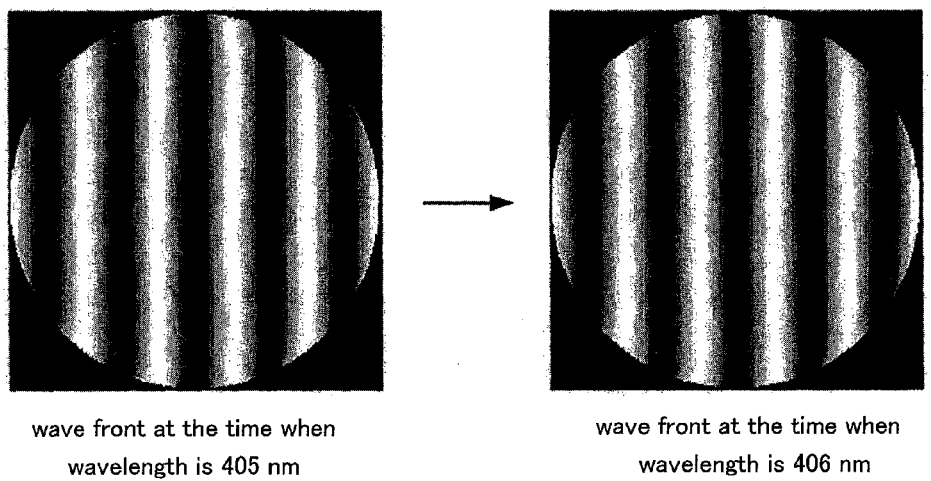
FIG. 14 is an illustration of an achromatic effect (wave front) exerted by a constitution of Table 3 according to the preferred embodiment.
Figure 15:
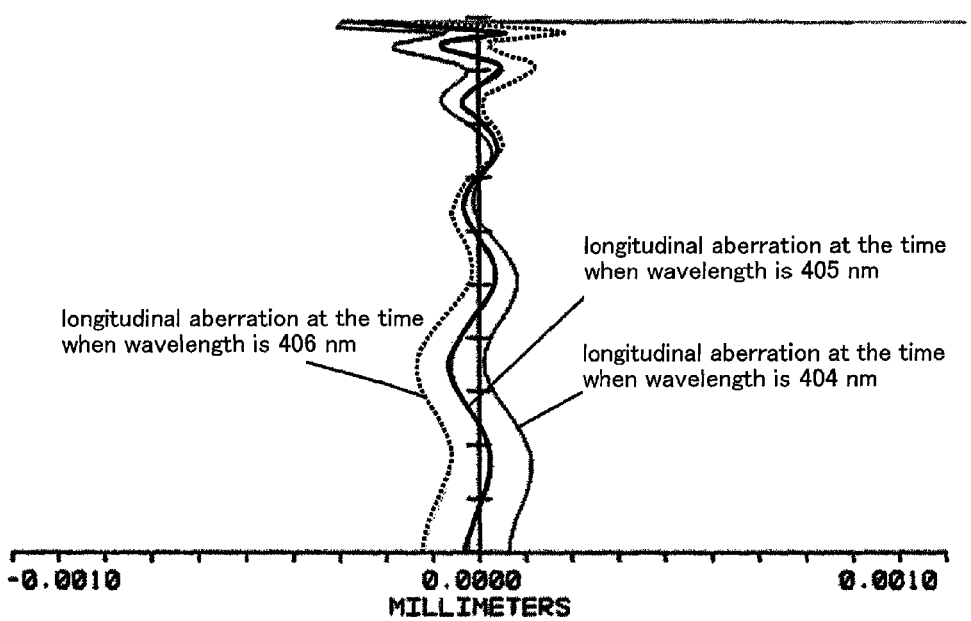
FIG. 15 is an illustration of an achromatic effect (longitudinal aberration) exerted by the constitution of Table 3 according to the preferred embodiment.

In the present example, the axial chromatic aberration of the object lens alone at the time when the wavelength changed from 405 nm by 1 nm was 0.25 μm. FIG. 11 is an illustration of longitudinal aberrations, and FIG. 12 illustrates wave-front states. The defocus in the wave front illustrated in FIG. 12 was around 86 mλ. The achromatic lens 20 was designed so that the aberration coefficient variation thereof was equal thereto, 86 mλ, in the direction opposite to the second object lens 13 (FIG. 13). When these two lenses are combined at their respective positions as illustrated in FIG. 4, the wave front variation resulting from the wavelength variation substantially disappears as illustrated in FIG. 14. Then, a mean value of the longitudinal aberrations is substantially zero during the wavelength variation as illustrated in FIG. 15. Thus, it is learnt that the axial chromatic aberration (defocus) does not occur, and φ−dia.a=2.229−2.131=0.098 mm is obtained then. The light flux entering the achromatic lens 20 can have a diameter smaller by 0.1 mm than that of the diameter of the incident light flux with respect to the second object lens 13. The height H of the BD optical system is H=WD+t1+d1+φ=0.301+1.796+1+2.229=5.325 mm, which is larger by around 0.3 mm than the targeted height value of the optical system. The description given so far is based on the assumption that the focus movable range d1 of the second object lens 13 for downward movement is 1 mm. But, depending on possible usages and the quality of discs to be used, d1 may be cut down by placing a higher priority on increasing WD and the light flux diameter. When d1=0.675 is set accordingly, the height H=5.0 mm can be obtained in the present example. It is a matter of course that the value of d1 may be further cut down so that the focal distance of the object lens can be set at a value larger than 1.3 mm as far as the focus movable range of the object lens is secured.

The description given so far demonstrated that the height of the optical system comprising the achromatic function can be reduced to such values that a very thin optical pickup device is feasible by disposing the achromatic lens 20 in a space between the two mirrors 9 and 12. However, in the present example, since it is necessary to create the space between the two mirrors 9 and 12 where the achromatic lens 20 is disposed, the two mirrors 9 and 12 should be more distantly spaced than in conventional structures. To more distantly space the mirrors is to more distantly space the two object lenses 10 and 13, which is not preferable in the structure of the present example wherein the two object lenses 10 and 13 are disposed in juxtaposition in a disc-scan direction. As illustrated in FIG. 2, the optical pickup device 17 is transferred on two shafts, which are the main shaft 18 and the sub shaft 19. Therefore, it is generally desirable to dispose the object lenses on the disc normal corresponding to a transfer azimuth because a track-tangent azimuth relative to a beam collecting spot is forced to vary between the inner and outer peripheries of the disc in the case where the positions of the object lenses are displaced from the normal. As a result, a malfunction may occur when a tracking error signal is detected. In the structure of the present example wherein the object lenses are disposed in juxtaposition, the interval between the two object lenses 10 and 13 is desired to be as small as possible from the viewpoint of the structure of an object lens actuator. Taking this in view, Tables 1 and 2 shows a structural example in which the achromatic lens 20 as relatively thin as 1 mm was used. In Table 1, to denotes the thickness of the achromatic lens 20, dia.a denotes the diameter of the incident light flux with respect to the achromatic lens 20, t1 denotes the thickness of the second object lens 13, φ denotes the diameter of the incident light flux with respect to the second object lens 13, and WD denotes the working distance of the second object lens 13.

Next, consideration is given to the interval between the two object lenses 10 and 13 in these examples. The values of d2, d3 tb and d4 are shown in the Table 4.

TABLE 4

| parameter | focal distance of object lens 8 | |
| --- | --- | --- |
| | 1.0 | 1.3 |
| d2 | 1.07 | 1.07 |
| d3 | 0.86 | 1.11 |
| tb | 1.14 | 1.10 |
| d4 | 0.86 | 1.11 |
| φ | 1.71 | 2.23 |
| L = d2 + d3 + tb + d4 | 3.92 | 4.40 |
| clearance ① between first mirror and achromatic lens | 0.50 | 0.50 |
| clearance ② between second mirror and achromatic lens | 0.50 | 0.50 |
| d(L + ① + ②) | 4.92 | 5.40 | unit [mm]

The thickness of the first mirror 9 is 1 mm, and the refractive index thereof is 1.538. The height of the achromatic lens 20 is 2.4 mm. Based on L=d2+d3+tb+d4, L=3.92 mm when the focal distance of the second object lens 13 is 1.0 mm, and L=4.40 mm when the focal distance of the second object lens 13 is 1.3 mm. An actual interval d between the object lenses 10 and 13 (see FIG. 17) equals L plus the clearance between the first mirror 9 and the achromatic lens 20 and the clearance between the second mirror 12 and the achromatic lens 20. With each of the clearances hypothetically set to 0.5 mm, the intervals between the two object lenses 10 and 13 are 4.92 mm and 5.40 mm, respectively.

Figure 17:
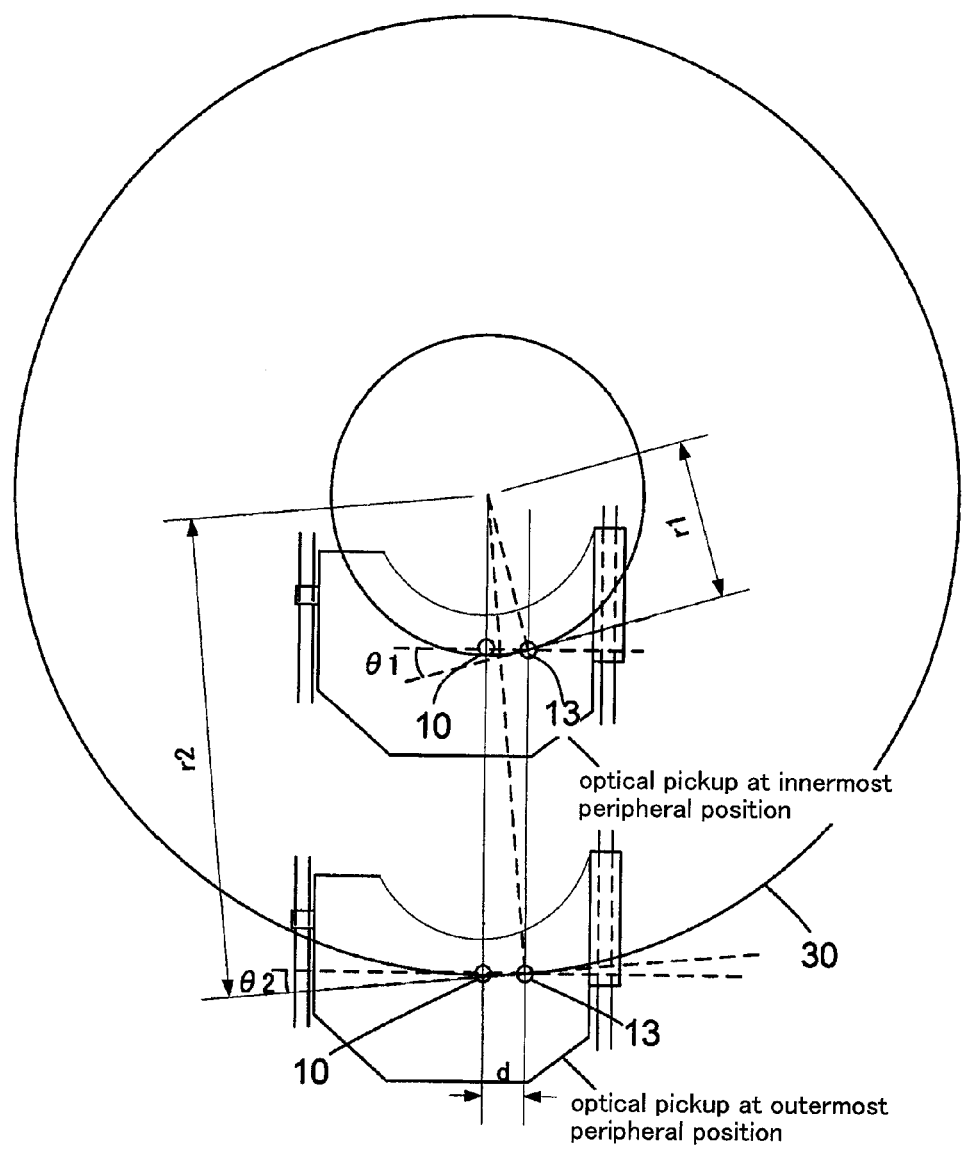
FIG. 17 is an illustration of a positional relationship between the object lens according to the preferred embodiment and a disc.
Figure 18:
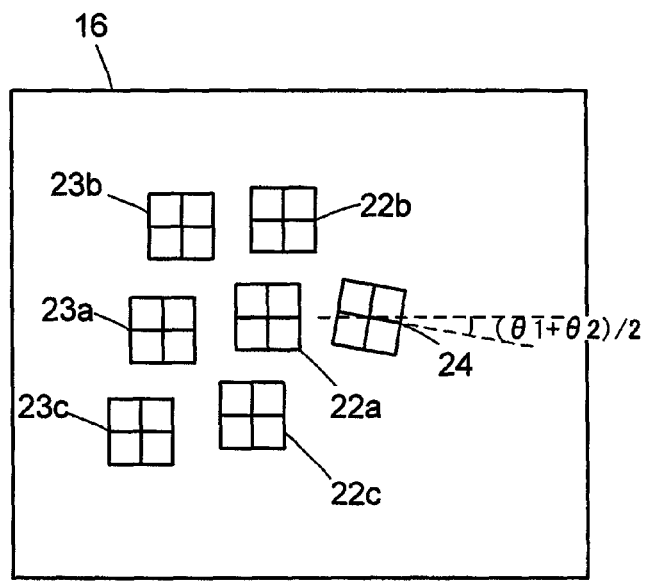
FIG. 18 is a drawing illustrating an exemplified constitution of a light detector according to the preferred embodiment.

The placement of and the interval between the two object lenses 10 and 13 (interval d between the object lenses) are described referring to FIG. 17. FIG. 17 is an illustration of an optical pickup device at an innermost peripheral position and an outermost peripheral position of an optical disc 30. In the drawing, the first object lens 10 for DVD and CD is placed on a disc normal corresponding to shaft transfer azimuth of the optical pickup device 17, and the second object lens 13 for BD is placed at a position distant from the normal, taking the fact into consideration that a tracking control system using three beams (hereinafter, 3-beam method) is generally employed for DVD and CD. The 3-beam system is not described in this specification because various methods are publicly known. The 3-beam system is a method in which the error signal quality is largely dependent on an angle made by azimuths of the three aligned beams and the track tangent. Therefore, the first object lens 10 for DVD and CD is placed on the disc normal. As a tracing system of BD, a 1-beam system is assumed. Examples of the 1-beam tracking system that can be employed are a push-pull method commonly used, and a method for computing after separately receiving a part of light flux using a hologram element. According to the 1-beam tracking system, because the error signal quality is not very dependent on the angle made by the beam azimuth on the disc and the track-tangent azimuth, the practicability of the device is not undermined even if the object lens position is displaced from the disc normal. Assuming that the angle made by the beam azimuth and the track azimuth at the innermost peripheral position is θ1 and the angle made by the beam azimuth and the track azimuth at the outermost peripheral position is θ2, the push-pull dividing line of a BD light receiving unit in the light detector 16 is rotated by an intermediate angle between θ1 and θ2 ((θ1+θ1)/2) as illustrated in FIG. 18. Then, tilts of the dividing line and the track azimuth can be controlled in the inner and outer peripheries in a balanced manner. In FIG. 18, reference symbols 22a, 22b and 22c denote a DVD (CD) light receiving unit, 23a, 23b and 23c denote a CD (DVD) light receiving unit, and 24 denotes a BD light receiving element.

Table 5 below shows the tilts of the dividing line and the track azimuth relative to the interval d between the object lenses in the case where r1=22 mm and r2=57 mm in the constitution illustrated in FIGS. 17 and 18.

TABLE 5

| | | | tilt of dividing line of light detector [deg] | tilts of dividing line and track azimuth | |
| --- | --- | --- | --- | --- | --- |
| d [mm] | θ1 [deg] | θ2 [deg] | | innermost periphery [deg] | outermost periphery [deg] |
| 5.4 | 14.2 | 5.4 | 9.8 | −4.4 | 4.4 |
| 5.2 | 13.7 | 5.2 | 9.5 | −4.2 | 4.2 |
| 5.0 | 13.1 | 5.0 | 9.1 | −4.1 | 4.1 |
| 4.8 | 12.6 | 4.8 | 8.7 | −3.9 | 3.9 |
| 4.6 | 12.1 | 4.6 | 8.3 | −3.7 | 3.7 |
| 4.4 | 11.5 | 4.4 | 8.0 | −3.6 | 3.6 |
| 4.2 | 11.0 | 4.2 | 7.6 | −3.4 | 3.4 |
| 4.0 | 10.5 | 4.0 | 7.2 | −3.2 | 3.2 |

According to the recited examples, the tilts of the dividing line and the track azimuth are about 4.4° even when d=5.4 mm. Therefore, the 1-beam tracking system can assure sufficient practicability. In the description earlier, the BD light receiving unit 24 in the light detector 16 is rotated; however, a dividing line of the hologram element may be rotated by an intermediate angle between θ1 and θ2 ((θ1+θ2)/2) according to the 1-beam tracking system using the hologram element. In that case, because it is unnecessary to rotate the BD light receiving unit 24 in the light detector 16, the BD light receiving unit can be used as the DVD light receiving unit or the CD light receiving unit. As described so far, it was learnt that the feasibility is not undermined by a relatively large interval d between the two object lenses from the viewpoint of a tracking control system. In the case where the two object lenses 10 and 13 which need to be provided in a movable element of the actuator has a too large interval therebetween, however, the object lens actuator may have to be large in size, or the rigidity of the movable element may be undermined and it may be difficult to obtain a weight balance. As a result, the actuator may not be able to maintain its expected performance. Table 6 shows a simulation result showing torsional resonance frequencies of the object lens actuator with the interval d ranging from 5.0 to 5.5. Though depending on a rotation speed of the disc, the torsional resonance equal to or below 15 KHz is generally not allowed in optical disc devices in light of the tracking control. Therefore, an upper limit of d is preferably 5.4.

TABLE 6

| center thickness of achromatic lens ta [mm] | d [mm] | torsional resonance frequency of actuator [KHz] | evaluation (>15 KHz) |
| --- | --- | --- | --- |
| 1.1 | 5.5 | 14.3 | X |
| 1.0 | 5.4 | 15.2 | ○ |
| 0.9 | 5.3 | 16.1 | ○ |
| 0.8 | 5.2 | 16.9 | ○ |
| 0.7 | 5.1 | 17.6 | ○ |
| 0.6 | 5.0 | 18.3 | ○ |

As described earlier referring to Table 4, in the case where about 0.5 mm is to be reserved for each of the clearance between the first mirror 9 and the achromatic lens 20 and the clearance between the second mirror 12 and the achromatic lens 20, the thickness of the achromatic lens 20 (center thickness) whose inter-lens interval d becomes 5.4 when the first and second object lenses 10 and 13 having the focal distance of 1.3 were used was 1.0 mm. According to the present invention, therefore, it is preferable that the inter-lens distance d be at most 5.4 mm, and the achromatic lens thickness (center thickness) be at most 1.0 mm.

Next is described an example in which the interval d between the two object lenses is further reduced. Table 7 below shows an example designed with the achromatic lens thickness of 0.5 mm.

TABLE 7

| | parameter | | value | unit |
|---|---|---|---|---|
| parameters of achromatic lens | ta(center thickness of achromatic lens) | | 0.5 | mm |
| | | dia.a | 1.658 | mm |
| | S1 | curvature radius | −5.5 | mm |
| | | conical constant | 0 | — |
| | S2 | curvature radius | ∞ | mm |
| | | conical constant | 0 | — |
| | | phase function A2 | −714.33752 | rad |
| | | A4 | −1.6505383 | rad |
| parameters of object lens | t1 | | 1.382 | mm |
| | φ | | 1.714 | mm |
| | focal distance of object lens | | 1.0 | mm |
| | object lens NA | | 0.85 | — |
| | S3 | curvature radius | 0.731772 | mm |
| | | conical constant | −0.590443 | — |
| | | asphericity #4 | 0.042751594 | |
| | | #6 | 0.083277635 | |
| | | #8 | −0.43075824 | |
| | | #10 | 2.1240263 | |
| | | #12 | −5.3128764 | |
| | | #14 | 6.6920009 | |
| | | #16 | −3.460594 | |
| | S4 | curvature radius | −1.15632 | mm |
| | | conical constant | 0 | — |
| | | asphericity #4 | 5.1162517 | |
| | | #6 | −55.609568 | |
| | | #8 | 468.95506 | |
| | | #10 | −2752.1432 | |
| | | #12 | 10176.821 | |
| | | #14 | −21100.783 | |
| | | #16 | 18641.243 | |
| | WD | | 0.231 | mm |
| substrate thickness of recording medium | | | 0.070 | mm |

Figure 19:
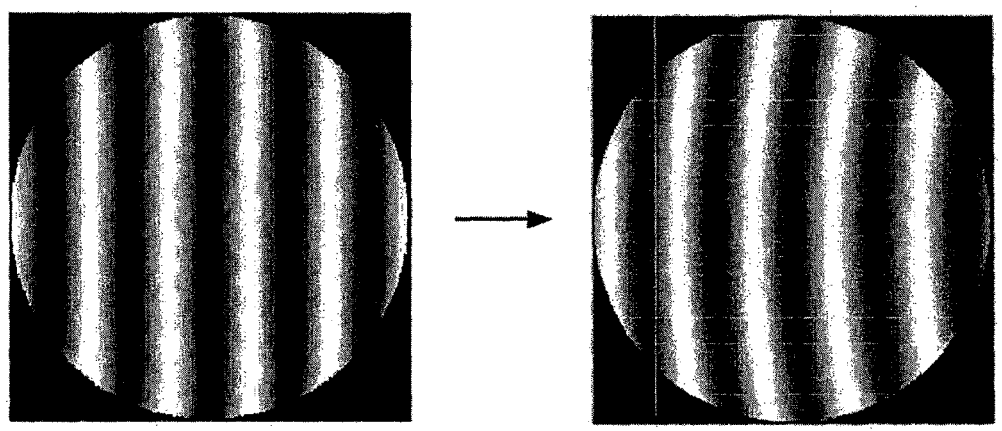
FIG. 19 is an illustration of color enhancing by an achromatic lens (Table 5) according to the preferred embodiment.

The axial chromatic aberration So of the object lens alone at the when the wavelength changes from 405 nm by 1 nm in the present example is 0.19 μm (see FIG. 6), and the wavefront defocus is around 66 mλ (see FIG. 7). The achromatic lens 20 was designed so that the aberration coefficient variation thereof was equal thereto, 66 mλ, in the direction opposite to the second object lens 13 (see FIG. 19). When these two lenses are combined at their respective positions as illustrated in FIG. 4, the wave front variation resulting from the wavelength variation substantially disappears as illustrated in FIG. 20. Then, a mean value of the longitudinal aberrations is substantially zero during the wavelength variation as illustrated in FIG. 21. Thus, it is learnt that the axial chromatic aberration (defocus) does not occur, and φ−dia.a=1.714−1.658=0.056 mm is obtained then. Thus, though the effect is lessened as compared with the achromatic lens thickness of 1 mm, the diameter dia.a of the incident light flux with respect to the achromatic lens can be configured to be smaller than the diameter φ of the emitting light flux. The thickness tb of the achromatic lens 20 then is 0.86 mm, and L is 3.42 mm. As previously described, the interval L between the two object lenses can be 4.42 in the case where the clearances between the mirrors and the achromatic lens have 1 mm in total. In order to further reduce the inter-lens distance d, the thickness of the first mirror 9 may be reduced.

So far described is the constitution wherein the achromatic lens 20 is provided in the space between the two mirrors 9 and 12, the height of the optical system comprising the achromatic function is controlled within such a small value that a very thin optical pickup device is feasible, and the distance d between the two object lenses is controlled within such a range that no problems occur in practical use. As mentioned in the description of the conventional technology, an eccentricity between the second object lens 13 and the achromatic lens 20, if any, may result in the problem that a convergent beam on an information recording surface of a disc is instantaneously off the track due to a chromatic difference of magnification at the time of switchover between recording and reproduction.

According to the present preferred embodiment, the achromatic lens 20 is immovably secured on the substrate-side of the optical pickup device 17, and the second object lens 13 is placed in the movable element and shifts following the disc eccentricity at the time of the tracking control. Therefore, even when the centers of the achromatic lens and the object lens may be coincident with each other in an initial assembling stage, the object lens may thereafter shift at the time of tracking control. If the wavelength variation is triggered then, the off-track takes place.

Figure 22:
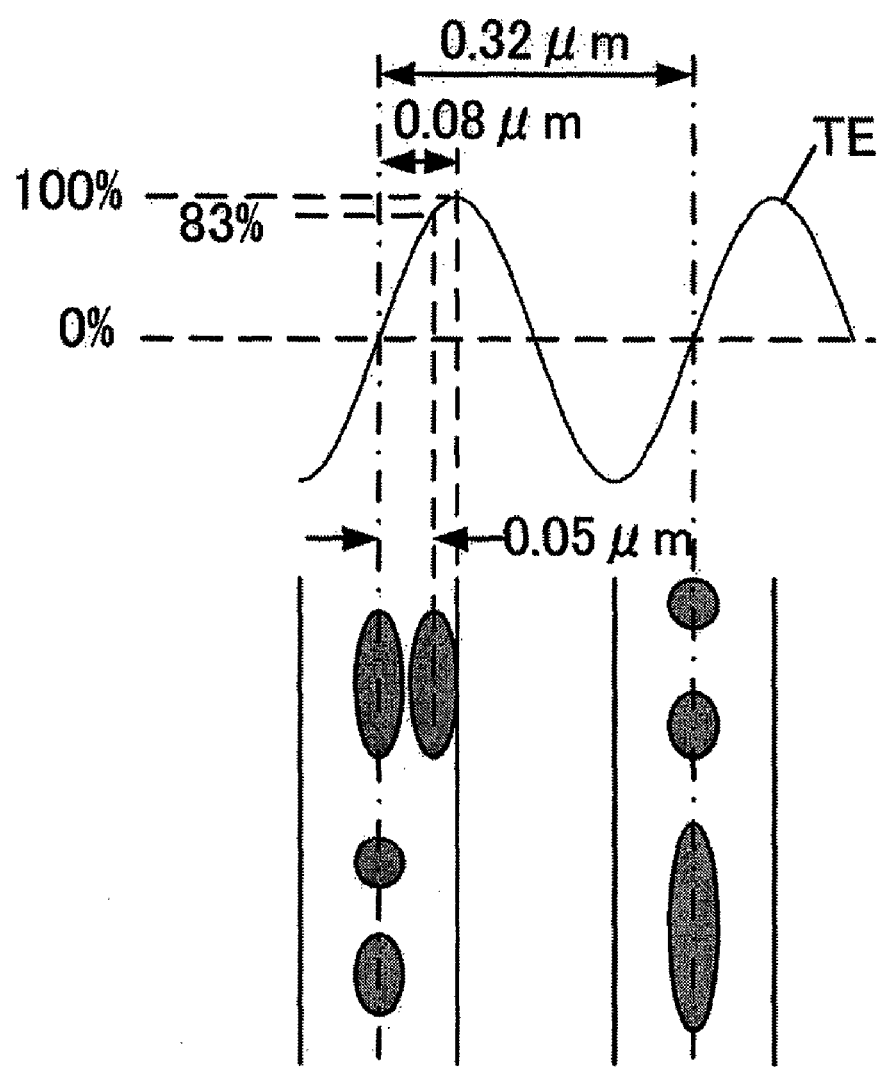
FIG. 22 is an illustration of a relationship between a tracking error signal and an off-track amount in BD.
Figure 25:
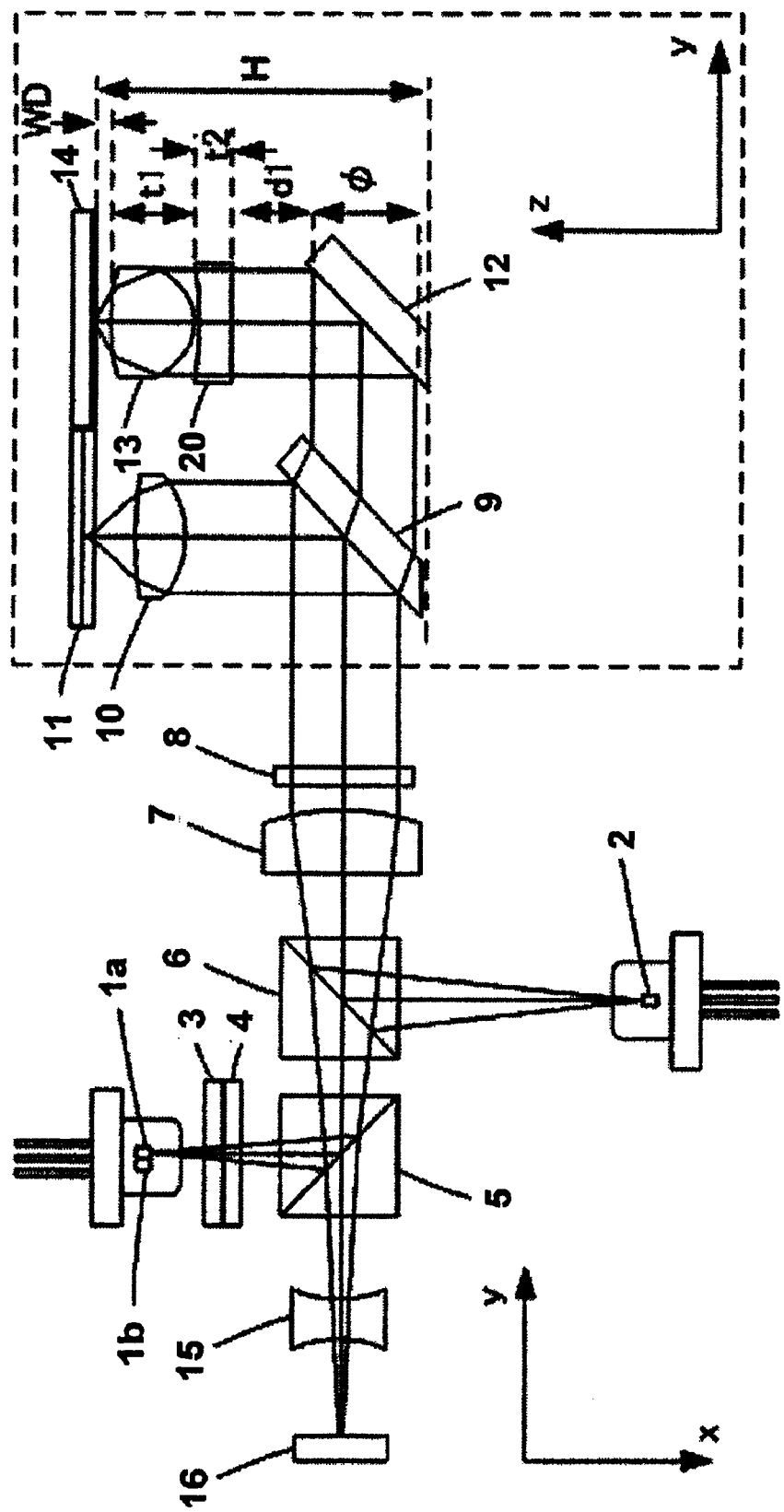
FIG. 25 is a drawing illustrating a constitution of a conventional optical pickup device.

Next is described an structural example designed to balance the off-track due to the chromatic difference of magnification with the defocus due to the axial chromatic aberration. In the constitution shown in Table 1 described earlier, 100% of the axial chromatic aberration generated in the second object lens 13 is corrected. Calculating the off-track when the wavelength shifts by 1 nm (405 mm→406 nm) with the second object lens 13 shifted by 0.2 mm, 0.05 μm was obtained. The track pitch of BD is 0.32 μm. Evaluating the tracking error signal in view of sine approximation as illustrated in FIG. 22, the off-track by 0.05 μm corresponds to 83% when 100% represents a center-to-peak dimension of the tracking error signal. Assuming that when a reproduction state suddenly shifts to a recording state during the shift of the object lens by 0.2 mm and the light source wavelength, which was 405 nm at the time of reproduction, instantaneously extends by 1 nm, the foregoing means that even if the tracking control is performed within the center of the tracking error signal (0% level position), the signal jumps to a signal-end level as soon as the recording starts. In such a case, not only the quality of the recorded signal may be deteriorated, but also the tracking control may break down.

Table 8 below shows an example of an achromatic lens for correcting 70% of the axial chromatic aberration of the object lens.

TABLE 8

| | parameter | | value | unit |
|---|---|---|---|---|
| parameters of achromatic lens | ta(center thickness of achromatic lens) | | 1 | mm |
| | | dia.a | 1.641 | mm |
| | S1 | curvature radius | −7.9 | mm |
| | | conical constant | 0 | — |
| | S2 | curvature radius | ∞ | mm |
| | | conical constant | 0 | — |
| | | phase function A2 | −491.48539 | rad |

TABLE 8-continued

| | parameter | | value | unit |
|---|---|---|---|---|
| | | A4 | −0.53175276 | rad |
| parameters of object lens | t1 | | 1.382 | mm |
| | φ | | 1.714 | mm |
| | focal distance of object lens | | 1.0 | mm |
| | object lens NA | | 0.85 | — |
| | S3 | curvature radius | 0.731772 | mm |
| | | conical constant | −0.590443 | — |
| | | asphericity #4 | 0.042751594 | |
| | | #6 | 0.083277635 | |
| | | #8 | −0.43075824 | |
| | | #10 | 2.1240263 | |
| | | #12 | −5.3128764 | |
| | | #14 | 6.6920009 | |
| | | #16 | −3.460594 | |
| | S4 | curvature radius | −1.15632 | mm |
| | | conical constant | 0 | — |
| | | asphericity #4 | 5.1162517 | |
| | | #6 | −55.609568 | |
| | | #8 | 468.95506 | |
| | | #10 | −2752.1432 | |
| | | #12 | 10176.821 | |
| | | #14 | −21100.783 | |
| | | #16 | 18641.243 | |
| | WD | | 0.231 | mm |
| substrate thickness of recording medium | | | 0.070 | mm |

When the achromatic lens is used, the off-track under the before-mentioned conditions can be reduced to 0.035 µm, and the level of the tracking error signal at the time of the shift to recording can be reduced to 63%. The axial chromatic aberration of around 0.06 µm remains as illustrated in FIG. 23, which, however, does not cause any problem in practical use.

Table 9 below shows an example of an achromatic lens for correcting 30% of the axial chromatic aberration of the object lens.

TABLE 9

| | parameter | | value | unit |
|---|---|---|---|---|
| parameters of achromatic lens | ta(center thickness of achromatic lens) | | 1 | mm |
| | dia.a | | 1.683 | mm |
| | S1 | curvature radius | −18.8 | mm |
| | | conical constant | 0 | — |
| | S2 | curvature radius | ∞ | mm |
| | | conical constant | 0 | — |
| | | phase function A2 | −211.632943 | rad |
| | | A4 | −0.046989 | rad |
| parameters of object lens | t1 | | 1.038 | mm |
| | φ | | 1.714 | mm |
| | focal distance of object lens | | 1.0 | mm |
| | object lens NA | | 0.85 | — |
| | S3 | curvature radius | 0.731772 | mm |
| | | conical constant | −0.590443 | — |
| | | asphericity #4 | 0.042751594 | |
| | | #6 | 0.083277635 | |
| | | #8 | −0.43075824 | |
| | | #10 | 2.1240263 | |
| | | #12 | −5.3128764 | |
| | | #14 | 6.6920009 | |
| | | #16 | −3.460594 | |
| | S4 | curvature radius | −1.15632 | mm |
| | | conical constant | 0 | — |
| | | asphericity #4 | 5.1162517 | |
| | | #6 | −55.609568 | |
| | | #8 | 468.95506 | |
| | | #10 | −2752.1432 | |
| | | #12 | 10176.821 | |
| | | #14 | −21100.783 | |
| | | #16 | 18641.243 | |
| | WD | | 0.231 | mm |
| substrate thickness of recording medium | | | 0.070 | mm |

When the achromatic lens is used, the off-track under the before-mentioned conditions can be reduced to 0.015 µm, and the level of the tracking error signal at the time of the shift to recording can be reduced to 29% The axial chromatic aberration of around 0.13 µm remains as illustrated in FIG. 24, which, however, does not cause any problem in practical use.

As described so far, it was learnt that the off-track due to the chromatic difference of magnification can be lessened by controlling the amount of the axial chromatic aberration of the achromatic lens. Accordingly, it is important to find a practical balance between the amount of the axial chromatic aberration to be corrected and the amount of the off-track due to the chromatic difference of magnification, taking all of the following factors into consideration: the output and characteristic of a light source to be used, an expected eccentricity of a disc to be used, and a system tolerance for defocus and off-track. According to the present invention, the amount of the axial chromatic aberration to be corrected by the achromatic lens 20 according to the present structure should be controlled in the range of 30%-70% of the axial chromatic aberration generated in the second object lens 13, and a very thin optical pickup device having a remarkable feasibility can be thereby obtained.

Table 10 shows a simulation result indicating the occurrence of a tracking failure due to the off-track resulting from the chromatic difference of magnification and the occurrence of a recording failure due to the defocus resulting from the axial chromatic aberration at the time when the axial chromatic aberration is corrected by 0% to 100% under the conditions that the shift of the object lens is 0.2 mm, and the laser wavelength shift is 1 nm when an output switches from a reproduction power to a recording power.

TABLE 10

| axial chromatic aberration to be corrected | when the object lens shift is 0.2 mm and the wavelength shift is 1 nm | | at the time of switch: reproduction → recording (wavelength shift of 1 nm) | |
|---|---|---|---|---|
| | off-track [µm] | defocus [µm] | tracking failure | recording failure due to defocus |
| 100% | 0.050 | 0.000 | X (occurred) | ○ (not occurred) |
| 95% | 0.048 | 0.009 | X (occurred) | ○ (not occurred) |
| 90% | 0.045 | 0.018 | X (occurred) | ○ (not occurred) |
| 85% | 0.043 | 0.027 | X (occurred) | ○ (not occurred) |
| 80% | 0.040 | 0.036 | X (occurred) | ○ (not occurred) |
| 75% | 0.038 | 0.046 | X (occurred) | ○ (not occurred) |
| 70% | 0.035 | 0.055 | ○ (not occurred) | ○ (not occurred) |
| 65% | 0.033 | 0.064 | ○ (not occurred) | ○ (not occurred) |
| 60% | 0.030 | 0.074 | ○ (not occurred) | ○ (not occurred) |
| 55% | 0.028 | 0.083 | ○ (not occurred) | ○ (not occurred) |
| 50% | 0.025 | 0.092 | ○ (not occurred) | ○ (not occurred) |
| 45% | 0.023 | 0.101 | ○ (not occurred) | ○ (not occurred) |
| 40% | 0.020 | 0.111 | ○ (not occurred) | ○ (not occurred) |
| 35% | 0.018 | 0.120 | ○ (not occurred) | ○ (not occurred) |
| 30% | 0.015 | 0.130 | ○ (not occurred) | ○ (not occurred) |
| 25% | 0.013 | 0.139 | ○ (not occurred) | X (occurred) |
| 20% | 0.010 | 0.148 | ○ (not occurred) | X (occurred) |
| 15% | 0.008 | 0.157 | ○ (not occurred) | X (occurred) |
| 10% | 0.005 | 0.166 | ○ (not occurred) | X (occurred) |
| 5% | 0.003 | 0.176 | ○ (not occurred) | X (occurred) |
| 0% | 0.000 | 0.185 | ○ (not occurred) | X (occurred) |

As is evident from the simulation result shown in Table 10, the axial chromatic aberration to be corrected by the achromatic lens 20 is preferably set in the range of 30%-70% of the axial chromatic aberration generated in the first and second object lenses 10 and 13.

While there has been described what is at present considered to be preferred embodiments of this invention, it will be understood that various modifications may be made therein, and it is intended to cover in the appended claims all such modifications as fall within the true spirit and scope of this invention.

What is claimed is:

1. An optical pickup device comprising:
    a first mirror for reflecting a first light beam outputted from a first light source and letting a second light beam outputted from a second light source pass therethrough;
    a first object lens for converging the first light beam reflected by the first mirror on an information recording surface of a recording medium;
    a second mirror for reflecting the second light beam passing through the first mirror;
    a second object lens for converging the second light beam reflected by the second mirror on the information recording surface of the recording medium; and
    an achromatic lens for correcting an axial chromatic aberration of the second object lens generated by wavelength variation of the second light beam, wherein
    the achromatic lens is provided in an optical path between the first mirror and the second mirror, wherein
    the achromatic lens comprises a diffractive surface and a concave surface, wherein the concave surface is disposed on a first-mirror side.

2. The optical pickup device as claimed in claim 1, wherein an outer diameter Lx of the achromatic lens in x direction and an outer diameter Lz thereof in z direction have a relationship of Lx>Lz, and the z direction corresponds to a thickness direction of the optical pickup device.

3. The optical pickup device as claimed in claim 1, wherein an numerical aperture NA of the second object lens is substantially at least 0.85, and a focal distance thereof is at least 1.0 and at most 1.3 mm.

4. The optical pickup device as claimed in claim 1, wherein a center thickness of the achromatic lens is at most 1 mm.

5. The optical pickup device as claimed in claim 1, wherein a distance between centers of the first object lens and the second objet lens is at most 5.4 mm.

6. The optical pickup device as claimed in claim 1, wherein a relationship in the second light source between an axial chromatic aberration So of the second object lens generated by a difference between a wavelength in recording information and a wavelength in reproducing the information and an axial chromatic aberration Sa to be corrected by the achromatic lens is $0.3 \times So \leqq Sa \leqq 0.7 \times So$.

7. An optical pickup device for recording and reproducing information with respect to a recording medium, comprising:
    a lens;
    a first mirror for reflecting a first light beam outputted from a first light source toward a first object lens facing an information recording surface of the recording medium; and
    a second mirror for reflecting a second light beam outputted from a second light source and passing through the first mirror toward a second object lens facing the information recording surface of the recording medium, wherein
    the lens is provided in an optical path between the first mirror and the second mirror,
    the lens comprises an achromatic function for correcting an axial chromatic aberration of the second object lens generated by wavelength variation of the second light beam, and
    the lens comprises a diffractive surface and a concave surface, wherein the concave surface is disposed on the optical pickup light source side.

8. The optical pickup device as claimed in claim 7, wherein an outer diameter Lx of the lens in x direction and an outer diameter Lz thereof in z direction have a relationship of Lx>Lz, and the z direction corresponds to a thickness direction of the optical pickup device.

9. The optical pickup device as claimed in claim 7, wherein a center thickness of the lens is at most 1 mm.

10. The optical pickup device as claimed in claim 7, wherein
    when the amount of an axial chromatic aberration of the second objet lens generated by a difference between a wavelength in recording information of the second light source and a wavelength in reproducing the information is So, an action of correcting the axial chromatic aberration is exerted and the amount to be corrected Sa is as follows: $0.3 \times So \leqq Sa \leqq 0.7 \times So$.

* * * * *